(12) United States Patent
Sussna

(10) Patent No.: US 11,783,641 B2
(45) Date of Patent: Oct. 10, 2023

(54) LIGHT ELECTRIC VEHICLE DEFECT MANAGEMENT

(71) Applicant: Uber Technologies, Inc., San Francisco, CA (US)

(72) Inventor: Daniel Andrew Sussna, San Francisco, CA (US)

(73) Assignee: UBER TECHNOLOGIES, INC, San Francisco, CA (US)

( * ) Notice: Subject to any disclaimer, the term of this patent is extended or adjusted under 35 U.S.C. 154(b) by 40 days.

(21) Appl. No.: 17/682,326

(22) Filed: Feb. 28, 2022

(65) Prior Publication Data

US 2022/0254197 A1 Aug. 11, 2022

Related U.S. Application Data

(63) Continuation of application No. 17/079,147, filed on Oct. 23, 2020, now Pat. No. 11,263,833.

(60) Provisional application No. 62/925,134, filed on Oct. 23, 2019.

(51) Int. Cl.
*G08G 1/123* (2006.01)
*G07C 5/00* (2006.01)
*G08G 1/00* (2006.01)

(52) U.S. Cl.
CPC ............. *G07C 5/008* (2013.01); *G07C 5/006* (2013.01); *G08G 1/205* (2013.01)

(58) Field of Classification Search
CPC ......... G07C 5/008; G07C 5/006; G08G 1/205
See application file for complete search history.

(56) References Cited

U.S. PATENT DOCUMENTS

| | | | |
|---|---|---|---|
| 6,438,471 B1 | 8/2002 | Katagishi et al. | |
| 9,738,125 B1 | 8/2017 | Brickley et al. | |
| 2004/0148083 A1 | 7/2004 | Arakawa et al. | |
| 2017/0186324 A1* | 6/2017 | Fish | G06Q 10/0833 |
| 2017/0344929 A1 | 11/2017 | Matsumura et al. | |
| 2020/0126320 A1 | 4/2020 | Tanuma et al. | |
| 2020/0193549 A1* | 6/2020 | Pedersen | G08G 1/052 |
| 2021/0125421 A1 | 4/2021 | Cooper et al. | |
| 2021/0272188 A1 | 9/2021 | Kobayashi | |

* cited by examiner

*Primary Examiner* — Hongmin Fan
(74) *Attorney, Agent, or Firm* — Dority & Manning, P.A.

(57) ABSTRACT

The present disclosure describes a system for detecting, identifying and addressing a maintenance event for light electric vehicles. The maintenance event may be detected based on rider profile information, riding parameter information and light electric vehicle information. If a maintenance event is detected, a light electric vehicle management system may determine an action that addresses the maintenance event and provide instructions regarding the action to the light electric vehicle and/or one or more individuals that are trained or otherwise certified to address the maintenance event.

20 Claims, 13 Drawing Sheets

LIGHT ELECTRIC VEHICLE DEFECT MANAGEMENT

PRIORITY CLAIM

The present application is a continuation of U.S. application Ser. No. 17/079,147 having a filing date of Oct. 23, 2020, which claims the benefit of U.S. Provisional Application Ser. No. 62/925,134 filed Oct. 23, 2019. Applicant claims priority to and the benefit of each of such applications and incorporate all such applications herein by reference in its entirety.

BACKGROUND

Electric vehicles, such as electric scooters and electric bicycles, are typically available for individuals to reserve and ride for a period of time. However, overtime, these electric vehicles may need to be serviced.

SUMMARY

The present disclosure describes methods and systems for detecting a maintenance event for light electric vehicles. As will be explained in greater detail below, the maintenance event may be detected in a number of different ways. For example, various sensors on or otherwise associated with the light electric vehicle may gather information about one or more performance metrics of the light electric vehicle. The information may then be provided to a light electric vehicle management system that determines, based on the sensor information, whether a maintenance event is occurring and how the maintenance event can be addressed. In some examples, rider habit information, either alone or in combination with the sensor information, may also be used to detect a maintenance event.

Accordingly, the present disclosure describes a computer-implemented method for detecting a maintenance event. In some examples, the method may be performed by a light electric vehicle management system. For example, the light electric vehicle management system may receive light electric vehicle information from one or more sensors associated with a light electric vehicle. When the light electric vehicle information is received, the light electric vehicle management system uses the light electric vehicle information to detect a maintenance event associated with the light electric vehicle. The light electric vehicle management system then determines an action that addresses the maintenance event. The light electric vehicle management system may also determine, based at least in part, on profile information of an individual that is riding or using the light electric vehicle, that the individual can perform the action. In response to determining that the individual can perform the action, the light electric vehicle management system generates a notification that provides information about how the maintenance event can be addressed. The light electric vehicle management system may then send the notification to a computing device associated with the individual.

The present disclosure also describes a system having at least one processor and a memory coupled to the at least one processor. The memory stores instructions that, when executed by the at least one processor, causes the at least one processor to perform operations. These operations comprise receiving light electric vehicle information from one or more sensors associated with a light electric vehicle. The light electric vehicle information is used to detect a maintenance event associated with the light electric vehicle. When the maintenance event is detected, an anticipated destination of the light electric vehicle is determined. The anticipated destination is based, at least in part, on rider profile information associated with an individual that is riding, has reserved or is otherwise using the light electric vehicle. When the anticipated destination is determined, one or more individuals that are associated with the anticipated destination and that are qualified to perform an action that addresses the maintenance event are identified. A notification may then be provided to a computing device associated with at least one of the one or more individuals. The notification may include a request that the at least one of the one or more individuals perform the action on the light electric vehicle when the light electric vehicle reaches the anticipated destination.

The present disclosure also describes a computer-implemented method for detecting a maintenance event. This method may be performed by a light electric vehicle management system. For example, the light electric vehicle management system may receive light electric vehicle condition information from a light electric vehicle. The light electric vehicle information may indicate a maintenance event. The light electric vehicle management system may determine a current location of the light electric vehicle. When a riding request is received, the light electric vehicle management system may determine whether the individual that submitted the request is associated with the current location of the light electric vehicle. The light electric vehicle management system may also determine based, at least in part, on profile information associated with the individual, whether the individual has training to perform an action to remedy or otherwise address the maintenance event. When the light electric vehicle management system determines the individual is trained to perform the action, a notification is provided to a computing device associated with the individual. The notification may include the current location of the light electric vehicle and the action to be performed on the light electric vehicle.

Also described is a computer-implemented method for detecting a maintenance event. In some examples, this method may be performed by a light electric vehicle management system. For example, the light electric vehicle management system may receive, in real-time or substantially real-time, a riding parameter associated with a rider of a light electric vehicle. The riding parameter may then be compared to a set of previously received and/or stored riding parameters. When the comparison of the riding parameters indicates the riding parameter is below an efficiency threshold, the light electric vehicle management system may request sensor information from one or more sensors associated with the light electric vehicle. The light electric vehicle management system may then determine based, at least in part, on the sensor information, whether the riding parameter being below the efficiency threshold is caused, at least in part, by a maintenance event associated with the light electric vehicle or a condition of the rider. When it is determined the riding parameter is below the efficiency threshold due to the maintenance event, the light electric vehicle management system provides a maintenance notification to the light electric vehicle and/or to a computing device associated with the rider.

The present disclosure also describes a computer-implemented method for addressing a detected maintenance event. In some examples, this method may be performed by a light electric vehicle management system. For example, the light electric vehicle management system may receive a riding parameter associated with a rider of a light electric vehicle and may also obtain a set of previously received riding parameters associated with the rider. The light electric vehicle management system may also determine that the riding parameter is below a riding parameter threshold associated with the rider based, at least in part, on a comparison of the riding parameter to the set of previously received riding parameters associated with the rider. In response to determining that the riding parameter is below the riding parameter threshold, the light electric vehicle management system may request sensor information from one or more sensors associated with the light electric vehicle. The light electric vehicle management system may also determine, based at least in part, on the sensor information, whether the riding parameter being below the riding parameter threshold is caused, at least in part, by a maintenance event associated with the light electric vehicle. The sensor information may be analyzed to determine whether the maintenance event is addressable by a set of instructions provided to the light electric vehicle. The set of instructions may be used to modify one or more operating parameters of the light electric vehicle. When it is determined that the maintenance event is addressable by the set of instructions, the light electric vehicle management system provides the set of instructions to the light electric vehicle.

Also described is a method for matching riders with light electric vehicles based, at least in part, on performance metrics of the light electric vehicle and on riding habits of the requesting rider. The method may be performed by a light electric vehicle management system. For example, the light electric vehicle management system may receive a light electric vehicle riding request from a computing device associated with an individual. The light electric vehicle management system may identify a stored rider profile associated with the individual and determine, based at least in part, on the rider profile, a riding behavior of the individual. The light electric vehicle management system may also determine a location of the individual and identify one or more light electric vehicles associated with the location of the rider. The light electric vehicle management system may also determine, based at least in part, on sensor information received from each of the one or more light electric vehicles, a performance metric of each of the one or more electric vehicles. The light electric vehicle management system may also compare the performance metric of each of the one or more light electric vehicles to the riding behavior of the individual and select at least one of the one or more light electric vehicles for the individual based, at least in part, on the comparison of the performance metric and the riding behavior. The light electric vehicle management system may then provide a location of the selected light electric vehicle to the computing device associated with the individual.

BRIEF DESCRIPTION OF THE DRAWINGS

Non-limiting and non-exhaustive examples are described with reference to the following Figures.

DETAILED DESCRIPTION

Figure 1:
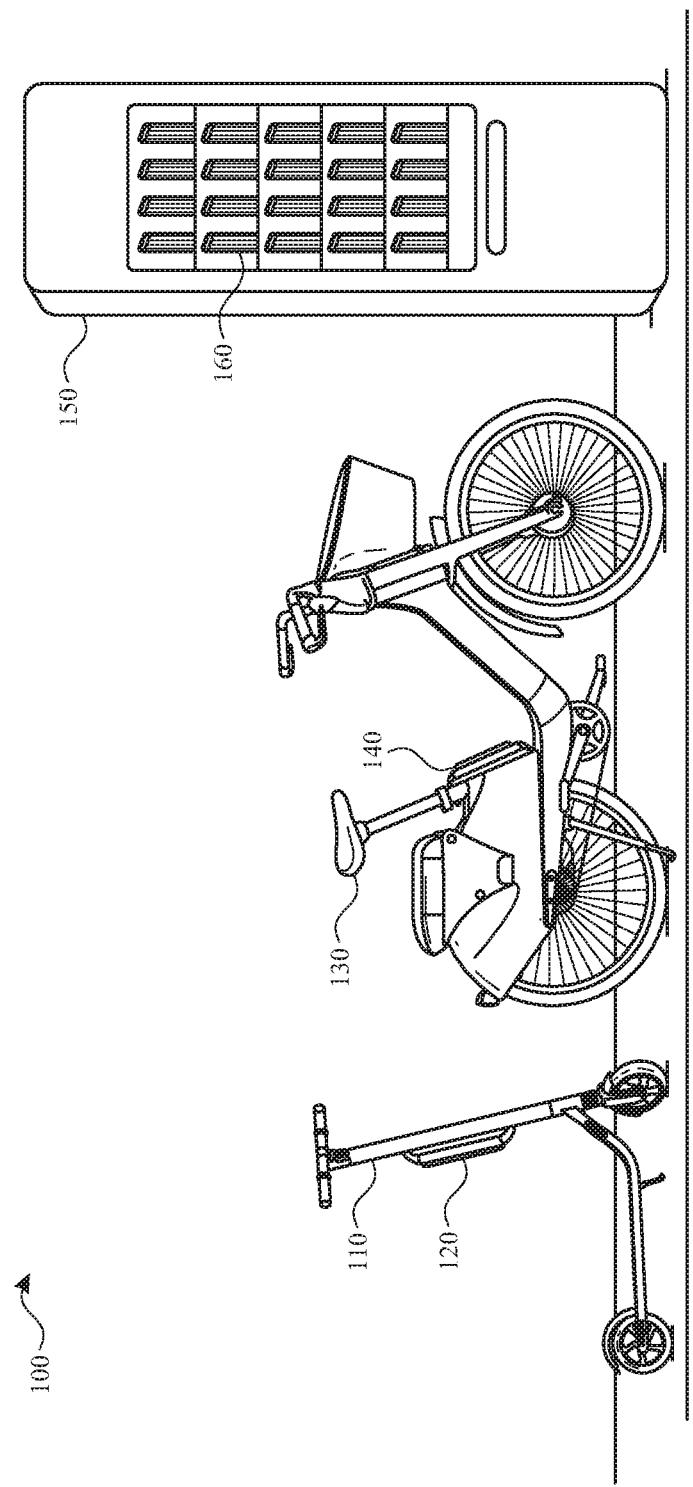
FIG. 1 illustrates a light electric vehicle ridesharing system according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Electric ridesharing vehicles, such as electric assist bicycles and electric scooters (also referred to herein as "electric vehicles" or "light electric vehicles"), are typically made available for individuals to reserve for a period of time. For example, in some examples, an individual may access an application executing on a mobile phone or other computing device and determine a location of one or more light electric vehicles within their vicinity. Once a particular light electric vehicle is located, the individual may reserve that particular light electric vehicle using the application. The individual may then proceed to the location of the light electric vehicle, activate the light electric vehicle and begin using the light electric vehicle. When the individual has reached her desired location, the individual may end their use of the light electric vehicle using the application. The light electric vehicle may then be subsequently reserved and/or used by another individual.

Because these light electric vehicles are available for use on public roads and are often parked outside, the light electric vehicles may be exposed to various environmental conditions such as rain, snow, sun, and so on. Over time, continuous exposure to these elements may damage the light electric vehicles. Additionally, as each of the light electric vehicles are used by various riders, the light electric vehicles may be subject to wear and tear and/or be damaged—either intentionally (e.g., vandalism) or unintentionally. Wear and tear and/or damage to the light electric vehicles may impact the overall performance of the light electric vehicles and as a result, could negatively impact the riding experience of a current rider and/or a subsequent rider.

As such, the present disclosure describes a light electric vehicle management system that determines, based on received light electric vehicle information from the light electric vehicle and/or rider profile information associated with a current rider, whether the light electric vehicle is operating below an operation threshold and/or whether various components of the light electric vehicle are operating as expected. As will be discussed in greater detail below, a light electric vehicle may include one or more sensors can take readings and/or determine the status or functionality of different components, systems and/or parts of the light electric vehicle.

For example, the light electric vehicle may have a sensor that determines the tire pressure of the light electric vehicle, a sensor that detects an amount of torque that is being applied to one or more pedals of the light electric vehicle, a sensor that detect an amount of traction provided by the tires of the light electric vehicle, and so on. In other examples, the information from the one or more sensors may be used to determine overall performance metrics of the light electric vehicle (e.g., battery usage rates, light electric vehicle speed, light electric vehicle acceleration, etc.). Using this information, the light electric vehicle management system may determine whether the light electric vehicle is experiencing or will experience a maintenance event and should be serviced. Although specific sensors are mentioned, the light electric vehicle may have any number of sensors that detect and/or determine a status of various components or parts of the light electric vehicle.

The light electric vehicle information gathered by the sensors may then be sent, via an application programming interface associated with the light electric vehicle, to the light electric vehicle management system. The light electric vehicle management system uses the information to detect a maintenance event. As used herein, the term "maintenance event" means that information collected or received from the light electric vehicle indicates that the light electric vehicle is operating below an operation threshold and as such, should be inspected, serviced and/or repaired by an individual that has been trained to perform the inspection, service and/or repair. For example, a maintenance event could be an indication or other notification that the light electric vehicle should be serviced, needs to be serviced, and/or will need to be serviced within an indicated or anticipated amount of time. In some examples, the information may indicate whether maintenance should be performed on the light electric vehicle and/or the type of maintenance that should be performed on the light electric vehicle. In other examples, the maintenance event may be addressed or fixed by one or more instructions provided by the light electric vehicle management system to the light electric vehicle. When a computing device associated with the light electric vehicle receives the instructions, the computing device may execute the instructions to address the maintenance event.

In some examples, the light electric vehicle information is collected in real-time or substantially real time—even when the light electric vehicle is being ridden by an individual. Thus, when the light electric vehicle management system determines that the collected light electric vehicle information indicates a maintenance event, the light electric vehicle management system may notify the individual that maintenance is required and/or that one or more operating parameters of the light electric vehicle may be changed. In some examples, the notification may be provided to the individual during the ride or may be provided to the individual once the individual has reached her destination. The notification may inform the individual of the maintenance event, indicate the type of maintenance that is required and provide one or more instructions on how to properly perform the maintenance.

Although the light electric vehicle management system may provide instructions to the individual on how to perform the maintenance, the individual may not feel comfortable performing the maintenance, be qualified to perform the maintenance, have the time to perform the maintenance, and/or have the necessary tools to perform the maintenance. As such, the light electric vehicle management system may store profile information of various individuals and only provide the maintenance notification and/or instructions to those individuals that are qualified to perform the determined maintenance.

In yet another implementation, when the light electric vehicle management system determines or otherwise detects a maintenance event, the current location and/or destination of the light electric vehicle is determined and/or anticipated. When this information is determined, the light electric vehicle management system may identify, using securely stored profile information of various individuals, one or more individuals that are within a threshold distance (e.g., one mile or less, two miles or less, three miles or less, etc.) from the location (or anticipated destination) of the light electric vehicle. The light electric vehicle management system may generate a notification of the maintenance event and provide the notification to a computing device associated with the one or more individuals. In some examples, the notification may include the detected issue, a determined action to be performed and the current location (or anticipated destination) of the light electric vehicle.

In either scenario explained above, when the individual has performed the requested action or maintenance, the sensors of the light electric vehicle may gather additional light electric vehicle information corresponding to the component or part of the light electric vehicle on which maintenance was performed. This information may be provided to the light electric vehicle management system. The light electric vehicle management system may use the additional information to determine whether the maintenance was performed properly. The light electric vehicle management system may then generate an additional notification that indicates whether the maintenance was performed properly and provide the additional notification to the computing device of the individual.

As discussed above, the sensor information may be used in combination with the rider profile information, and/or requested additional sensor information to diagnose or otherwise determine a maintenance event and/or determine why the light electric vehicle is operating below the operation threshold.

For example, When the light electric vehicle management system detects a maintenance event or otherwise identifies an issue that is causing the light electric vehicle to operate below an operation threshold, the light electric vehicle management system may determine whether the issue can be addressed and/or resolved by sending one or more instructions to a control system of the light electric vehicle or whether the issue should be addressed and/or resolved by having the light electric vehicle serviced by a technician. If the issue can be addressed or resolved by sending one or more instructions to the control system of the light electric vehicle, the light electric vehicle management system sends the one or more instructions to the control system of the light electric vehicle.

For example, a riding parameter associated with a current rider may be received by the light electric vehicle management system. The light electric vehicle management system may compare the current riding parameter to riding parameters associated with stored and/or received rider profile information associated with the current rider. The comparison may indicate that the current rider is riding the light electric vehicle along a particular route at a lower rate of speed than the current rider normally rides the light electric vehicle along that particular route. In such examples, the light electric vehicle management system may request sensor information from one or more sensors associated with the light electric vehicle in order to determine the cause for the lower rate of speed.

When the sensor information is received, the light electric vehicle management system may determine that an electric assist motor of the light electric vehicle is not providing sufficient power to the light electric vehicle to enable the current rider to maintain their determined normal rate of speed along the particular route or part of the route. In such examples, the light electric vehicle management system can send one or more instructions to the control system of the light electric vehicle. The control system can use the instructions to cause the electric assist motor to provide additional power to help the current rider reach and/or maintain her determined normal rate of speed along the route.

In another example, the light electric vehicle management system may receive sensor information from a light electric vehicle and use the sensor information to build a rider profile of a particular individual. The rider profile may include information about whether the individual is an aggressive rider or a passive rider (e.g., referred to herein as a "rider type" or a "type of rider"), known riding routes of the individual (e.g., a route between work and home), frequency of ride/use requests, and so on. The light electric vehicle management system can use the rider profile to match the particular rider with a particular light electric vehicle that matches the rider type and provide the location of that light electric vehicle to a computing device of the particular rider.

The light electric vehicle management system may create a set of predefined rider profiles based, at least in part, on one or more rider types. For example, the set of predefined rider profiles may include an experienced rider profile, a new rider profile, a power rider profile, a commuter profile, an aggressive rider profile, etc. Based on profile information associated with an individual and/or past riding information associated with the individual, the individual may be placed in, associated with and/or moved between these various predefined groups. The light electric vehicle management system may then match a particular individual to a particular light electric vehicle that is more suited to the individual based, at least in part, on the assigned predefined group.

For example, when the particular rider sends a use request to the light electric vehicle management system, the light electric vehicle management system may determine which light electric vehicles in a location associated with the particular rider are more suited to the riding style of the particular rider. The location of the identified light electric vehicles may then be provided to a computing device of the particular rider.

Accordingly, the present disclosure provides a plurality of technical benefits including but not limited to improving maintenance downtime for light electric vehicles by detecting or predicting maintenance events as the maintenance events occur or prior to one occurring, improving a user experience of light electric vehicles by ensuring the light electric vehicle is operating as expected and by matching individuals to light electric vehicles that have features or performance characteristics that match the riding style of the individual, improving the safety of the riders of light electric vehicles among other examples.

These and other features will be described in more detail below with respect to FIG. 1-FIG. 10.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables a user, using a client application executing on a computing device, to locate, request, and/or reserve (e.g., rent or borrow for a duration of time) one or more light electric vehicles.

In some examples, the network service includes one or more computing systems or servers that are remote from the computing device of the user and the light electric vehicles. The one or more computing systems includes an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the user receives, from the network service over the network communication channel, information about a location of one or more of the light electric vehicles. The location of each of the light electric vehicles can then be provided on a user interface of the client application.

In one example, the user interface of the client application includes a map that displays a determined location of the user and/or a determined location of the light electric vehicles. In some examples, the determined location of the user and/or the determined location of the light electric vehicles is based, at least in part, on Global Positioning System (GPS) data (or other location information) received by the network service over the network communication channel.

The user interface of the client application displays the location information of the user and the light electric vehicles as different icons (or other such representations). Once the location information is displayed, the user may select an icon representing a type of light electric vehicle (e.g., an icon for an electric scooter 110 or an icon for an electric bicycle 130). The user interface of the client application then generates or determines a route (e.g., provides directions) from the user's current location to the selected light electric vehicle. Selection of one of the icons may also enable the user to reserve (e.g., place a hold on) the light electric vehicle (to ensure that the light electric vehicle will be at the determined location when the user arrives), rent the light electric vehicle and/or borrow the light electric vehicle for a period of time.

Each light electric vehicle and/or the network service also includes a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every five minutes, every ten minutes, etc.). In yet other examples, the location tracking system may track the location of the light electric vehicle in real-time or substantially real-time when the light electric vehicle is reserved, rented or otherwise used by a user and may track location information at periodic intervals when the light electric vehicle has been reserved or is otherwise not in use.

The one or more computing systems of the network service also include one or more databases that store information about each of the light electric vehicles and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been used, whether the light electric vehicle is damaged, whether the light electric vehicle should be serviced etc.).

The one or more databases may also store information about the user. This information may include a profile of the user (e.g., username, contact information, etc.) security credentials of the user (e.g., a password), historical usage data, payment information and the like.

The one or more computing systems of the network service may also include a matching system. The matching system receives, manages or otherwise handles various requests from the user. The requests may include light electric vehicle rental requests and light electric vehicle reservation requests. For example, when a vehicle rental request is received from the client application executing on the user's computing device, the matching system may communicate with the location tracking system and determine which light electric vehicle should be matched with or otherwise assigned to the requesting user.

The one or more computing systems of the network service may also include a payment system that processes payment information of the user. For example, when a user rents and uses a light electric vehicle, the user may be charged for the usage based on a duration of use and/or a travel distance. Once the user has finished using the light electric vehicle (e.g., by arriving at their intended destination, a check-in point, a rechargeable battery kiosk 150, etc.), the payment system may automatically process the payment information of the user.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gear ratios, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 manages the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the user and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual user may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the user. In another example, the rechargeable battery and/or battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the user. When this occurs, the user may be directed to a rechargeable battery kiosk 150. For example, the network service can transmit data, over one or more networks, to the computing device to cause the computing device to display information about a particular rechargeable battery kiosk 150 to travel to.

When the user arrives at the rechargeable battery kiosk 150, the user may exchange the light electric vehicle's current battery with another rechargeable battery housed by the rechargeable battery kiosk 150, thereby enabling the light electric vehicle to continue or resume operation. In some instances, the user can use the client application executing on the computing device of the user to locate and/or select a rechargeable battery kiosk 150, receive directions to the rechargeable battery kiosk 150, and initiate a battery swap with the rechargeable battery kiosk 150 when the user arrives at its location.

According to examples, when a battery swap is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when a user is traveling through the geographic region on an light electric vehicle and wants or needs to exchange the light electric vehicle's current rechargeable battery for one that has more charge, the user may be directed (e.g., via the client application executing on the user's computing device) to the rechargeable battery kiosk 150 associated with the geographic region. When the user arrives at the rechargeable battery kiosk 150, the user can exchange their current rechargeable battery for one that is fully charged or substantially fully charged. This enables the user to travel using a light electric vehicle across distances that may otherwise not be possible using the power provided by one charge of a rechargeable battery.

In some examples, the rechargeable battery kiosk 150 comprises a control system that communicates directly or indirectly with a computing device of the user when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, an amount of rechargeable batteries currently available at the rechargeable battery kiosk, and/or usage demand statistics.

Figure 2A:
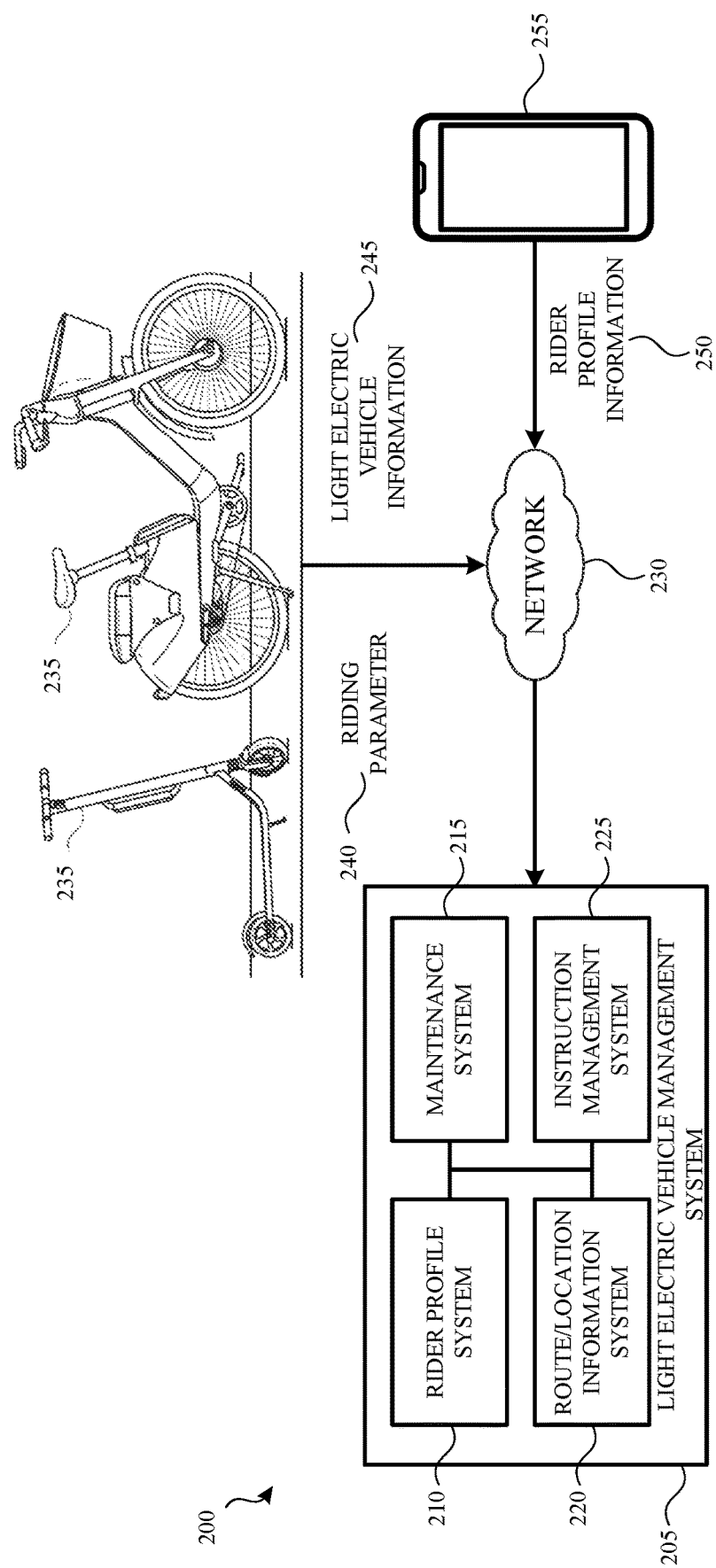
FIG. 2A illustrates a light electric vehicle management system for detecting a maintenance event for a light electric vehicle according to an example.

FIG. 2A illustrates a system 200 for detecting a maintenance event for light electric vehicles 235 according to an example. The system 200 may be used with any number of different light electric vehicles 235 including electric bicycles, electric scooters, and so on. Although FIG. 2A illustrates a single electric bicycle and a single electric scooter (collectively referred to as light electric vehicle(s) 235), the system 200, and more specifically, the light electric vehicle management system 205, may detect maintenance events, determine the cause of the maintenance events and determine how to address the maintenance events for a number of different light electric vehicles individually or at the same time or substantially the same time.

The system 200 includes a light electric vehicle management system 205. The light electric vehicle management system 205 may include a rider profile system 210, a maintenance system 215, a route/location information system 220 and an instruction management system 225. In order to detect a maintenance event, the light electric vehicle management system 205 may receive different types of information from a variety of different sources.

For example, and as shown in FIG. 2A, the light electric vehicle management system 205 may receive light electric vehicle information 245 and/or riding parameter information 240 from a light electric vehicle 235 over a network 230. Additionally, the light electric vehicle management system 205 may receive rider profile information 250 from a computing device 255 associated with an individual over the network 230. As will be explained in more detail below, the light electric vehicle management system 205 may use the received information to detect a maintenance event, determine the cause of the maintenance event and determine how to address the maintenance event.

For example, when an individual wants to reserve and use a light electric vehicle 235, the individual may access an application executing on the computing device 255 and submit a reservation request (also referred to as use request), over the network 230, to the light electric vehicle management system 205. In some examples, the application executing on the computing device 255 may provide rider profile information 250 to the rider profile system 210 of the light electric vehicle management system 205.

Although the light electric vehicle management system 205 collects various types of data related to the individual, in some examples, the individual may control or otherwise indicate what information and/or what types of information the light electric vehicle management system 205 can request, receive and/or store. For example, an individual may either opt in or opt out of any data collection process described herein. This may include indicating data that can be collected and/or stored by the systems described herein and which data cannot be collected and/or stored by the systems described herein.

The rider profile information 250 may contain profile information about the individual that submitted the reservation request. For example, the rider profile information 250 may contain information about the number of times the individual has reserved and/or used light electric vehicles 235, one or more routes taken by the individual while using light electric vehicles 235, the times of day and/or days of the week the individual reserved and/or used light electric vehicles 235, light electric vehicle riding habits of the individual (e.g., how fast the individual typically rides light electric vehicles 235, a pedaling cadence of the individual, amount of power of a rechargeable battery that is typically consumed by the light electric vehicle 235), whether the individual has been trained or is otherwise certified to perform maintenance, service and/or repairs of light electric vehicles 235, and so on.

For example, the rider profile information 250 may include information that the individual typically reserves a light electric vehicle 235 on Monday, Wednesday and Friday mornings at 7:00 AM. The rider profile information 250 may also indicate that the individual typically reserves the light electric vehicle 235 at or near a particular origin (e.g., near the individual's home) and travels a particular route to a particular destination (e.g., to the individual's work). Likewise, the rider profile information 250 may indicate that the individual typically reserves a light electric vehicle on Monday, Wednesday and Friday evenings at 6:00 PM and takes a particular route from an origin (e.g., the individual's work) to a destination (e.g., the individual's home).

The rider profile information 250 may also include information about light electric vehicle riding habits of the individual along the particular route, on those particular days and/or those particular times of the day. For example, the rider profile information 250 may indicate that the individual typically rides ten miles-per-hour during the individual's morning commute from the particular origin to the particular destination. The rider profile information 250 may also indicate that the individual pedals at a particular cadence and causes the light electric vehicle 235 to consume five percent of the power in a rechargeable battery of the light electric vehicle 235. Likewise, the rider profile information 250 may indicate that the individual's evening commute from the particular origin to the particular destination has similar or different riding parameters. Although specific riding habits and values are mentioned, these are for example purposes only.

The rider profile information 250 may also include information as to whether the individual has been trained or is otherwise certified (e.g., has a particular certification level) to perform maintenance on the light electric vehicle 235. The certification level may include information regarding one or more actions the individual is authorized to perform on the light electric vehicles 235. In some examples, the actions may be related to or otherwise address a particular maintenance event.

As used herein, the term "maintenance" means to perform one or more repairs to the light electric vehicle 235 and/or perform one or more services. These repairs and/or services may include repairing and/or replacing one or more tires on the light electric vehicle 235, repairing and/or replacing one or more wheels on the light electric vehicle 235, repairing and/or replacing one or more spokes of the wheels of the light electric vehicle 235, repairing detected electrical faults of the light electric vehicle 235, repairing detected alignment issues, repairing or replacing a drivetrain of the light electric vehicle 235, repairing and/or replacing one or more brakes and/or a braking system of the light electric vehicle 235, and so on. Although specific repairs are mentioned, the rider profile information 250 may indicate the certification level of the individual and whether the individual can perform various other types of repairs and services. Additionally, the certification level of some individuals may indicate that they are trained or are otherwise authorized to perform a first set or type of maintenance and/or repairs but not a second type of maintenance and/or repairs while the certification level of other individuals may indicate that they are trained to perform any type of requested maintenance and/or repairs.

The rider profile information 250 may be provided to the rider profile system 210 each time a light electric vehicle 235 is reserved and/or used by the individual. In other examples, the rider profile system 210 may receive and use sign-in credentials from the computing device 255 associated with the individual to access rider profile information 250 that has been securely stored in the rider profile system 210. The stored rider profile information 250 may be updated as new or additional information (e.g., additional routes taken by the individual, changes in riding habits, updates to maintenance authorization status, etc.) is received from the computing device 255.

For example, the rider profile information 250 may include rider habit information. The rider habit information may be provided to the rider profile system 210 in real-time or substantially real-time as the individual is riding a light electric vehicle 235. Thus, the light electric vehicle management system 205 may be able to detect changes to the individual's riding habits and determine, in real-time or substantially real-time, if those changes are due to a maintenance event or if the changes are potentially due to a condition of the rider (e.g., the rider is simply riding slower, potentially not feeling well, etc.).

As briefly discussed above, rider habit information may include information about a pedaling cadence of the individual as the individual rides the light electric vehicle 235, an average or typical speed at which the individual rides the light electric vehicle 235, an average amount of power of a rechargeable battery used by the light electric vehicle 235 when the individual is riding the light electric vehicle 235 (e.g., how much the individual pedals the light electric vehicle 235 versus relying on the electric assist motor of the light electric vehicle 235), gear ratio shifting habits (e.g., how often, when and where along a route the individual shifts gear ratios) of the individual, and so on.

The rider habit information may also be used to determine whether the individual has different riding habits based on, for example, time of the day, day of the week, location, anticipated route, and so on. For example, an individual may have a first set of riding habits during the week as the individual commutes from home to work. However, the individual may have a second set of riding habits on the weekend. Each of these different riding habits, and detected changes to the different riding habits, may be used to detect a maintenance event.

Although the above examples indicate that route information and/or rider habit information is received from a computing device 255, in some instances, the rider profile system 210 may receive route information, rider habit information, reservation information and/or origin/destination information of the individual from the light electric vehicle 235. For example, the light electric vehicle 235 may provide GPS data or other location information to the light electric vehicle management system 205. Likewise, the light electric vehicle management system 205 may receive rider habit information (e.g., gear ratio shifting habits, average speed, pedaling cadence, etc.), represented as riding parameter 240 information, from the light electric vehicle 235. The light electric vehicle management system 205 may store the received information in the rider profile system 210 associated with the individual that reserved and is riding the light electric vehicle 235. In some examples, the route information and/or location information of the light electric vehicle 235 may be received and/or stored by the route/location information system 220.

The route/location information system 220 may also receive and/or store topology information about a particular route. The topology information may be used to help determine whether a detected decrease in performance metrics, either by the individual riding the light electric vehicle 235 and/or by the light electric vehicle 235, is a potential maintenance event or is based, at least in part, on a current location of the light electric vehicle 235.

For example, if the light electric vehicle management system 205 receives riding parameter information 240 indicating that the individual is riding the light electric vehicle 235 more slowly than usual, the route/location information system 220 may be able to determine, based on received current location information of the light electric vehicle 235, that the individual is riding the light electric vehicle 235 up a hill. As such, the decrease in speed of the light electric vehicle 235 may be based on the location of the light electric vehicle 235 and not the result of a maintenance event.

The light electric vehicle management system 205 may also be able to accurately predict, determine and/or anticipate a route of travel of the individual using the rider profile information 250. In some examples, this includes determining or anticipating different topographies along a route or an anticipated route. For example, if the individual reserves the light electric vehicle 235 at 7:00 AM on Monday morning, the light electric vehicle management system 205 may determine, based on rider profile information 250, that the individual is going to work. The light electric vehicle management system 205 may also determine, using rider profile information 250, that the individual will most likely take a particular route on the way to work.

Using this information, the light electric vehicle management system 205 may determine or otherwise anticipate riding parameters of the individual along the route. The anticipated riding parameters (or stored riding parameters of the individual on past routes) may be compared with actual riding parameters 240 of the individual (e.g., riding parameter 240 information received in real-time or substantially real time as the individual is riding the light electric vehicle 235 along the route) to determine whether the light electric vehicle 235 may be experiencing a maintenance event.

For example, if the anticipated riding parameters are within a similarity threshold of the actual riding parameters 240, the light electric vehicle management system 205 may determine the light electric vehicle 235 is operating as expected. As such, no maintenance event is occurring. However, if the anticipated riding parameters are not within a similarity threshold of the actual riding parameters 240, the light electric vehicle management system 205 may determine that the light electric vehicle 235 is not operating as expected. As such, a maintenance event may be occurring and the light electric vehicle management system 205 may request light electric vehicle information 245 from the light electric vehicle 235.

As briefly discussed above, the light electric vehicle management system 205 may also receive light electric vehicle information 245 from the light electric vehicle 235 over the network 230. The light electric vehicle information 245 may include information about one or more operating parameters of the light electric vehicle 235. In some examples, the light electric vehicle information 245 may be collected by one or more sensors associated with the light electric vehicle 235. The information collected by the sensors may be used to determine whether the light electric vehicle 235 is operating below an operation threshold and/or whether various components of the light electric vehicle 235 are operating as expected.

For example, the light electric vehicle 235 may have a sensor that reads the tire pressure of the light electric vehicle 235, a sensor that detects an amount of torque that is being applied to one or more pedals of the light electric vehicle 235, a sensor that detect an amount of traction provided by the tires of the light electric vehicle 235, and so on. In other examples, the information from the one or more sensors may be used to determine performance metrics of the light electric vehicle 235. The performance metrics of the light electric vehicle 235 may include a rechargeable battery usage rate of the light electric vehicle 235, an average or top speed of the light electric vehicle 235, how quickly the light electric vehicle 235 can accelerate, how long it takes the light electric vehicle 235 to stop when one or more brakes are applied in relation to, for example, how hard the individual riding the light electric vehicle 235 is applying the brakes, balance characteristics (e.g., whether the alignment of the tires and/or spokes of the wheel(s) of the light electric vehicle 235 cause the light electric vehicle 235 to be wobbly) of the light electric vehicle 235, an amount of power provided by an electric assist motor of the light electric vehicle 235, and so on. Although specific sensors are mentioned, the light electric vehicle 235 may have any number of sensors that detect and/or determine a status of various components or parts of the light electric vehicle 235.

When this information is received by the light electric vehicle management system 205 (e.g., via an API and/or over the network 230), the light electric vehicle management system 205 may determine, using the received information, whether the light electric vehicle 235 is experiencing a maintenance event. In other examples, while a maintenance event may not be currently occurring, the light electric vehicle management system 205 can use the received information to anticipate a maintenance event. For example, if the received information is trending in such a way as to indicate a maintenance event will occur, the light electric vehicle management system 205 may take preemptive actions to remedy the anticipated maintenance event.

The information may also be used to determine whether the change or decrease in performance of the light electric vehicle 235 is due, at least in part, to the individual that is riding the light electric vehicle 235. For example, if the operating parameters of the light electric vehicle 235 indicate that the various components or systems of the light electric vehicle are operating as expected, the light electric vehicle management system 205 may determine that the individual is the cause for the decrease in performance.

For example, one or more torque and/or cadence sensors associated with the light electric vehicle 235 may provide information about the amount of force the individual is applying to one or more pedals of the light electric vehicle 235 and/or how fast the individual is pedaling the light electric vehicle 235. The light electric vehicle management system 205 may compare the received information with previously received torque and/or cadence sensor information associated with the individual and determine that the individual is fatigued. As such, the light electric vehicle management system 205 may adjust an operating parameter of the light electric vehicle 235 such that an electric assist motor of the light electric vehicle 235 provides additional power to help the individual maintain their desired or typical speed.

In another example, one or more sensors (e.g., a steering sensor) associated with the light electric vehicle 235 may detect that the light electric vehicle 235 is swerving, the position of the handlebar is askew, and/or the light electric vehicle 235 is generally unstable. Using this information, the light electric vehicle management system 205 may determine that the individual is intoxicated. As such, the light electric vehicle management system 205 may change one or more operating parameters of the light electric vehicle 235

(e.g., by ending a use period of the light electric vehicle 235 or causing the electric assist motor of the light electric vehicle 235 to stop providing power to the light electric vehicle). Although specific examples have been given, the light electric vehicle management system 205 may use sensor information to determine or detect any number of rider conditions.

In yet another example, received sensor information may indicate one or more issues in an environment in which the light electric vehicle is operating. For example, if a steering position sensor on multiple different light electric vehicles 235 provides information to the light electric vehicle management system 205 that multiple different riders along a particular route swerve at or near the same location, the light electric vehicle management system 205 may determine that there is an issue (e.g., a pothole or other roadway hazard) with the environment in which the light electric vehicle 235 is operating.

Similarly, sensors of one or more light electric vehicles 235 may detect that one or more tires of the light electric vehicle 235 slip at a particular location along a route. As such, the light electric vehicle management system 205 may determine that there is gravel, mud, loose dirt etc. on a road or path.

In such examples, the light electric vehicle management system may provide a notification 285 to the computing device 255 associated with the individual that the individual is approaching a hazard, that one or more operating parameters of the light electric vehicle 235 may or will be changed (at least temporarily) and/or send instructions to the light electric vehicle 235 that change one or more operating parameters of the light electric vehicle 235. For example, the light electric vehicle management system 205 may cause a top speed (or current speed) of the light electric vehicle 235 to be reduced until the individual has passed the detected hazard. The notification 285 may be a visual notification, an audible notification and/or a haptic/tactile notification.

Referring back to the previous example in which the maintenance event is caused by one or more components or systems of the light electric vehicle 235, the light electric vehicle management system 205 may determine whether the maintenance event can be addressed remotely or whether the maintenance event is only addressable by a technician. For example, the light electric vehicle management system may determine whether the maintenance event can be addressed by sending one or more instructions to the light electric vehicle 235 or whether the maintenance event should be addressed by a technician or other individual that has the training, certification level and/or experience to address the maintenance event.

For example, when the light electric vehicle management system 205 receives the light electric vehicle information 245 and/or the riding parameter information 240, the received information may be provided to the maintenance system 215. The maintenance system 215 may use this information to detect whether a maintenance event is occurring, whether a maintenance event is likely to occur, determine what is causing the maintenance event and determine how the maintenance event should be addressed. Once the maintenance system 215 determines the cause of the maintenance event and how to address the maintenance event, the instruction management system 225 may provide instructions on how to address the maintenance event to one or more of the light electric vehicle 235, the computing device 255 associated with the individual riding the light electric vehicle 235 or another individual that is certified or otherwise trained to perform one or more maintenance actions on the light electric vehicle 235.

Figure 2B:
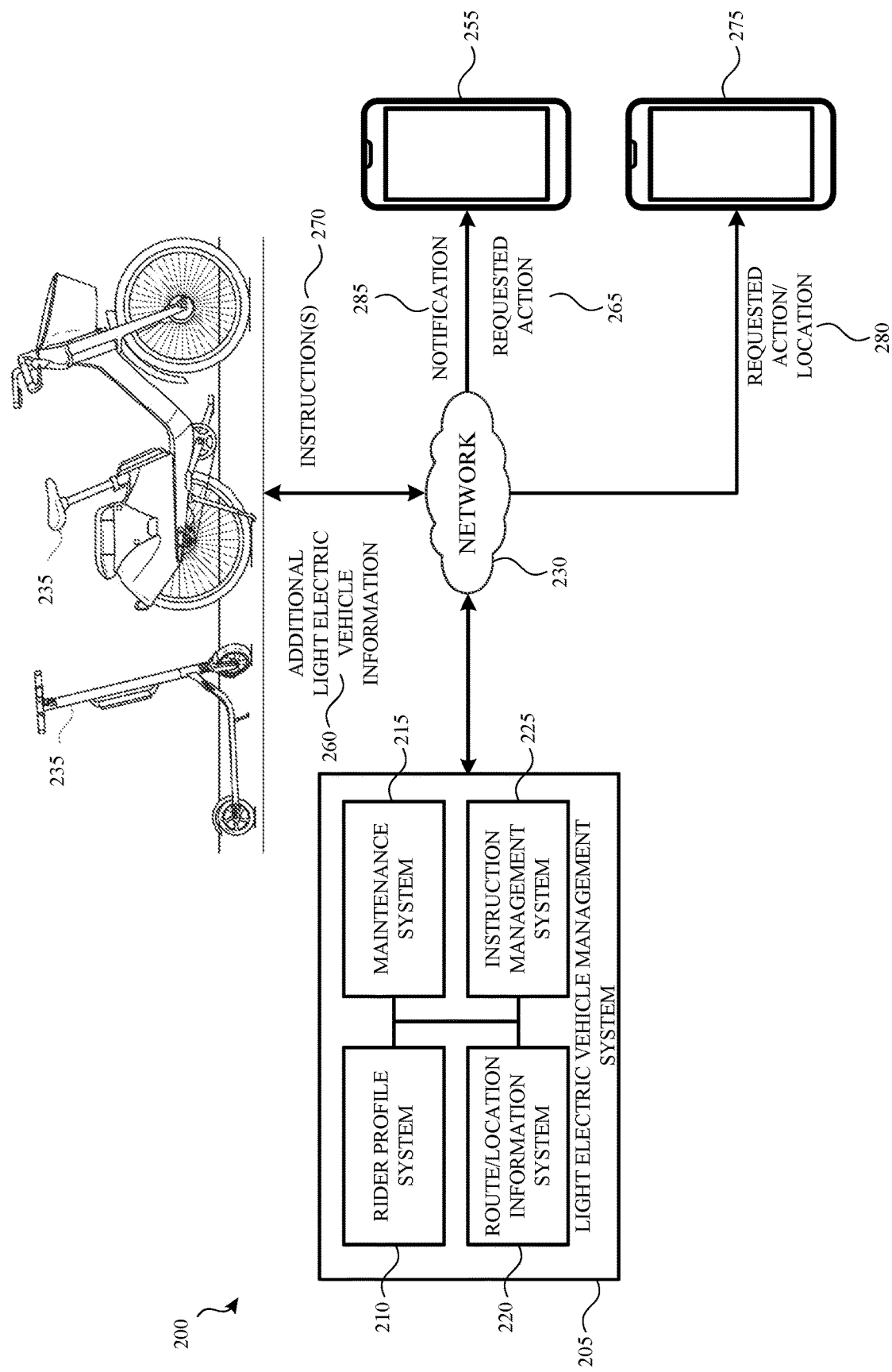
FIG. 2B illustrates the light electric vehicle management system of FIG. 2A sending instructions that address the maintenance event to one or more computing devices and/or to one or more light electric vehicles according to an example.

For example and referring to FIG. 2B, when the maintenance system 215 determines that a maintenance event is occurring, will occur, or has occurred, the maintenance system 215 may determine the cause of the maintenance event and one or more possible solutions that address (either temporarily or permanently) the maintenance event. As part of this process, the maintenance system 215 may determine whether the maintenance event can be addressed remotely (e.g., by sending one or more instructions 270 to the light electric vehicle 235) or whether a technician or other individual should provide maintenance to or otherwise service the light electric vehicle 235.

For example, if the maintenance system 215 determines, based on received riding parameter 240 information and/or light electric vehicle information 245, that the electric assist motor of the light electric vehicle 235 is not providing a sufficient amount of power to the light electric vehicle 235, the maintenance system 215 may determine that this particular maintenance event can be addressed, at least temporarily, by enabling the electric assist motor to output more power. As such, the instruction management system 225 may provide these instructions 270 to a computing device or control system associated with the light electric vehicle 235. In some examples, the light electric vehicle management system 205 may also send a notification 285 to the computing device 255 associated with the individual that the light electric vehicle 235 is experiencing (or has experienced) a maintenance event and how the maintenance event is (or was) addressed.

In another example, the maintenance system 215 may detect, based on received sensor information, a high resistance or an increase in current between the rechargeable battery of the light electric vehicle 235 and an electric assist motor of the light electric vehicle 235. In this example, the maintenance system 215 may determine that the light electric vehicle has faulty wiring. As such, the maintenance system 215 may determine that this particular maintenance event can only be addressed by an individual with the certification level or other such qualifications or experience to fix or repair the faulty wiring.

The maintenance system 215 may interact with the rider profile system 210 to determine whether the individual that is currently riding the light electric vehicle 235 has been trained or is otherwise qualified to address this particular maintenance event (e.g., the faulty wiring). If the rider profile information 250 of the individual indicates that she is trained or is otherwise qualified to perform an action that addresses the maintenance event, the instruction management system 225 may transmit the requested action 265, along with one or more instructions on how to perform the requested action 265, to the computing device 255 associated with the individual.

In other examples, the maintenance system 215 may determine, based on rider profile information 250, that the individual that is currently riding the light electric vehicle 235 has not been trained to fix or otherwise address the detected maintenance event. In such examples, the light electric vehicle management system 205 may send a notification 285 to the computing device 255 associated with the individual to notify the individual that the light electric vehicle 235 is experiencing (or has experienced) a maintenance event.

In some examples, the notification 285 may also include instructions about how the individual should proceed. For example, the notification may indicate that the individual should proceed to their intended destination, that the individual should end their use as soon as possible, or that the individual should take the light electric vehicle 235 to a particular destination so the light electric vehicle 235 can be serviced. In some examples, the individual may be provided with an incentive for following the instructions in the notification 285.

When the maintenance system 215 determines the individual does not have an appropriate certification level or has not been trained to address the maintenance event, the maintenance system 215 may interact with the rider profile system 210 and/or the route/location information system 220 to determine a current location of the light electric vehicle 235 and/or an anticipated destination of the light electric vehicle 235 (e.g., based, at least in part, on rider profile information 250 of the individual that is currently riding the light electric vehicle 235). The light electric vehicle management system 205 may also determine whether there are any individuals at or near the current location and/or anticipated destination that have the training or experience to address the maintenance event.

For example, when the maintenance event is detected, the maintenance system 215 may interact with the rider profile system 210 to determine the location of one or more individuals that have the training or certification level to address the detected maintenance event. Once those individuals have been identified, the maintenance system 215 and/or rider profile system 210 may determine which of those individuals are at or near to the current location of the light electric vehicle 235 or the anticipated destination of the light electric vehicle 235. The instruction management system 225 may then provide a requested action/location 280 of the light electric vehicle 235 to a computing device 275 associated with the identified individual.

When the requested action/location 280 is received by the identified individual, the identified individual may have the opportunity to accept performance of the requested action or deny the request. In some examples, if the identified individual accepts the request, the identified individual may be provided an incentive (e.g., payment, discounts on future rides, etc.) for performing the requested action. In some examples, the location of the light electric vehicle 235 is not provided to the identified individual until the current reservation/riding period of the light electric vehicle 235 is complete. In other examples, the individual that is riding the light electric vehicle may be provided a notification (e.g., on her computing device 255 and/or on a display of the light electric vehicle 235) and/or an incentive to take the light electric vehicle 235 to a location at or near the location of the identified individual so the identified individual can perform the requested action 280. At that point, the individual may end their reservation of the light electric vehicle 235 and/or start another reservation period with a different light electric vehicle 235.

When the requested action is performed (e.g., either by the individual that is currently riding the light electric vehicle or by the identified individual), the light electric vehicle 235 may send additional light electric vehicle information 260 to the light electric vehicle management system 205. The additional light electric vehicle information 260 may be used by the maintenance system 215 to determine whether the maintenance event was addressed correctly and/or completely. For example, if the requested action 260/280 relates to addressing a tire pressure issue for the light electric vehicle 235, the additional light electric vehicle information 260 may contain tire pressure sensor information in order to determine whether the requested action 260/280 was taken and/or whether it was performed correctly.

As discussed above, a maintenance event may be detected by the maintenance system 215 based on riding parameter 240 information and/or light electric vehicle information 245. However, in some examples, the maintenance system 215 may require additional information to help ensure the diagnosis of the maintenance event is correct. For example, if the riding parameter 240 information indicates the individual riding the light electric vehicle 235 is traveling at a lower rate of speed along a particular route than the individual has previously traveled, but the maintenance system 215 cannot, with the current information diagnose a maintenance event, the maintenance system 215 may request additional light electric vehicle information 260 to help determine whether a maintenance event is occurring. If the light electric vehicle 235 is experiencing a maintenance event, the maintenance event may be addressed such as previously described.

Although the examples provided above disclose how maintenance events can be detected in real-time or substantially real-time, and how those maintenance events can be addressed, the system 200 may also predict whether a maintenance event is likely to occur in the future. For example and as described above, the light electric vehicle management system 205 may receive riding parameter 240 information and/or light electric vehicle information 245. Using this information, the light electric vehicle management system 205 may be able to anticipate whether a particular type of maintenance event will occur and preemptively address the maintenance event.

For example, if the riding parameter 240 information indicates that an individual is pedaling more often along a particular route or part of a route than the individual has typically done in the past, or the individual is shifting gears more often along a particular route or part of the route, the light electric vehicle management system 205 may request additional light electric vehicle information 260 from the light electric vehicle 235 and/or provide instructions 270 to the light electric vehicle 235 such as previously described. The instructions 270 may be used to increase the amount of power provided by the electric assist motor to help the individual maintain their average speed along the route. Thus, the instructions may preemptively address the anticipated maintenance event before it impacts the individual riding the light electric vehicle 235.

Figure 3A:
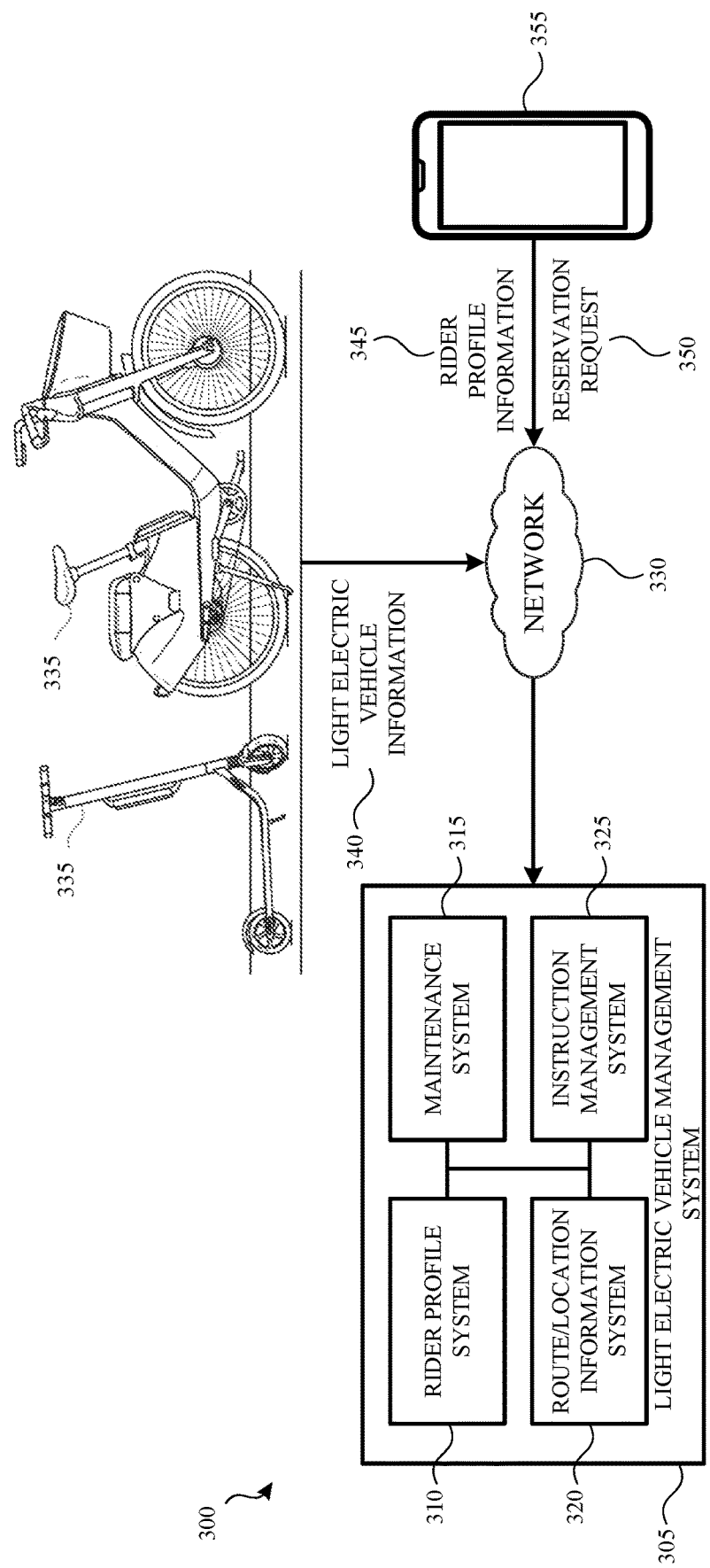
FIG. 3A illustrates a light electric vehicle management system for detecting a maintenance event for a light electric vehicle according to another example.
Figure 3B:
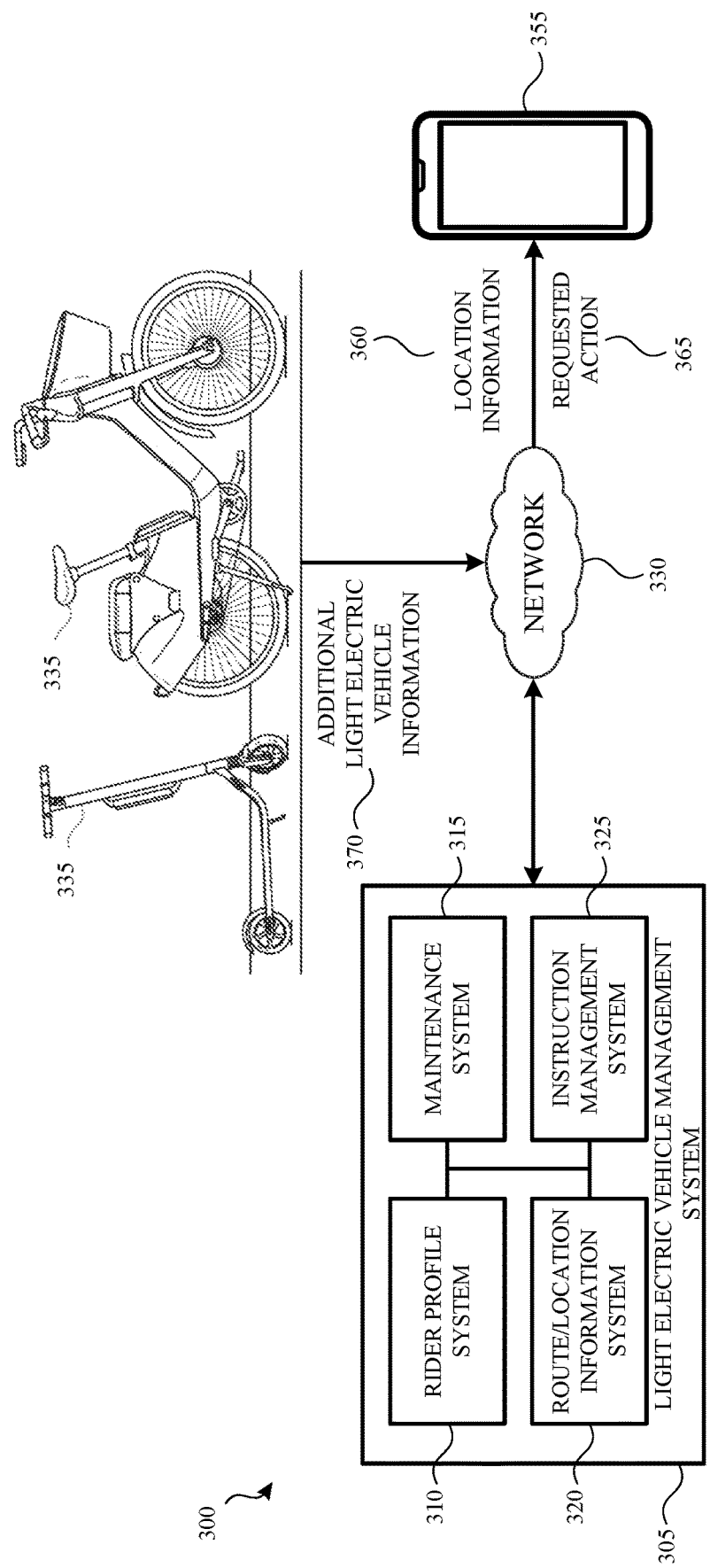
FIG. 3B illustrates the light electric vehicle management system of FIG. 3A sending instructions that address the maintenance event to one or more computing devices according to an example.

FIG. 3A illustrates an example system 300 for matching an individual with a light electric vehicle 335 based, at least in part, on a determined rider type of the individual. The rider type may be based, at least in part, on rider profile information 345 associated with the individual. In some examples, the system 300 may be used to match an individual with a particular riding type and/or a riding preference (e.g., aggressive riders) with a particular light electric vehicle 335. Additionally, the system 300 may be used to identify individuals that have been trained or are otherwise certified to address maintenance events and direct those individuals to light electric vehicles 335 that need maintenance.

In some examples, the system 300 may have a set of predefined rider profiles each of which are associated with a particular rider type. For example, the system 300 may include an experienced rider profile, a new rider profile, a power rider profile, an aggressive rider profile and a commuter profile. Although specific rider profiles are mentioned, these are for example purposes only and the system 300 may have any number of different predefined rider profiles. Additionally, new rider profiles may be added and existing rider profiles may be removed and/or edited.

The system 300 may also automatically associate a particular individual with one or more of the predefined rider profiles based, at least in part, on profile information associated with the individual and/or past (or current) riding information associated with the individual. When an individual has been matched or is otherwise associated with a particular predefined rider profile, the system 300 may match a particular individual with a particular light electric vehicle having features, functionalities and/or operating parameters that are suited to the riding style/preferences of the individual.

As shown in FIG. 3A, the system 300 includes similar systems to the system 200 shown and described with respect to FIG. 2A. It should be understood that the systems shown and described with respect to FIG. 3A function in a similar manner as the systems shown and described with respect to FIG. 2A.

For example, the system 300 includes a light electric vehicle management system 305. The light electric vehicle management system 305 includes a rider profile system 310, a maintenance system 315, a route/location information system 320 and an instruction management system 325. The light electric vehicle management system 305 may receive light electric vehicle information 340 from one or more light electric vehicles 335 over a network 330 such as previously described.

The light electric vehicle management system 305 may also receive rider profile information 345 from a computing device 355 associated with an individual. The rider profile information 345 may be included or otherwise associated with a reservation request 350 or use request. The reservation request 350 may be provided to the light electric vehicle management system 305 when the individual wants to reserve a light electric vehicle 335.

For example, when an individual wants to reserve and use a light electric vehicle 335, the individual may access an application executing on the computing device 355 and submit reservation request 350, over the network 330, to the light electric vehicle management system 305. In some examples, the application executing on the computing device 355 may provide the rider profile information 345 to the rider profile system 310 of the light electric vehicle management system 305. In other examples, once the individual has been identified by the rider profile information 345, the rider profile system 310 may access securely stored profile information of the individual in order to determine riding habits of the individual, a riding profile of the individual a rider type of the individual, whether the individual is authorized or is otherwise trained to address one or more maintenance events and/or perform one or more services on light electric vehicles 335, a current location of the individual, past routes taken by the individual, and so on.

When the location of the individual is determined, the light electric vehicle management system 305 may determine or identify one or more light electric vehicles 335 that are in or otherwise associated with the location of the individual. Once one or more light electric vehicles 335 in or around the location of the individual are identified, the maintenance system 315 may determine whether any of the identified light electric vehicles 335 are experiencing, have experienced and/or are anticipated to experience a maintenance event. As previously discussed, the maintenance system 315 may detect a maintenance event based, at least in part, on light electric vehicle information 340 and/or received riding parameter information (e.g., riding parameter 240 information (FIG. 2A)).

Using the rider profile information 345, the light electric vehicle management system 305 may determine whether the requesting individual is trained and/or authorized to address the detected maintenance event. If so, the maintenance system 315, the instruction management system 325 and/or the route/location information system 320 may provide location information 360 (FIG. 3B) of the light electric vehicle 335 experiencing the maintenance event and a requested action 365, to the computing device 355 associated with the requesting individual.

Figure 4:
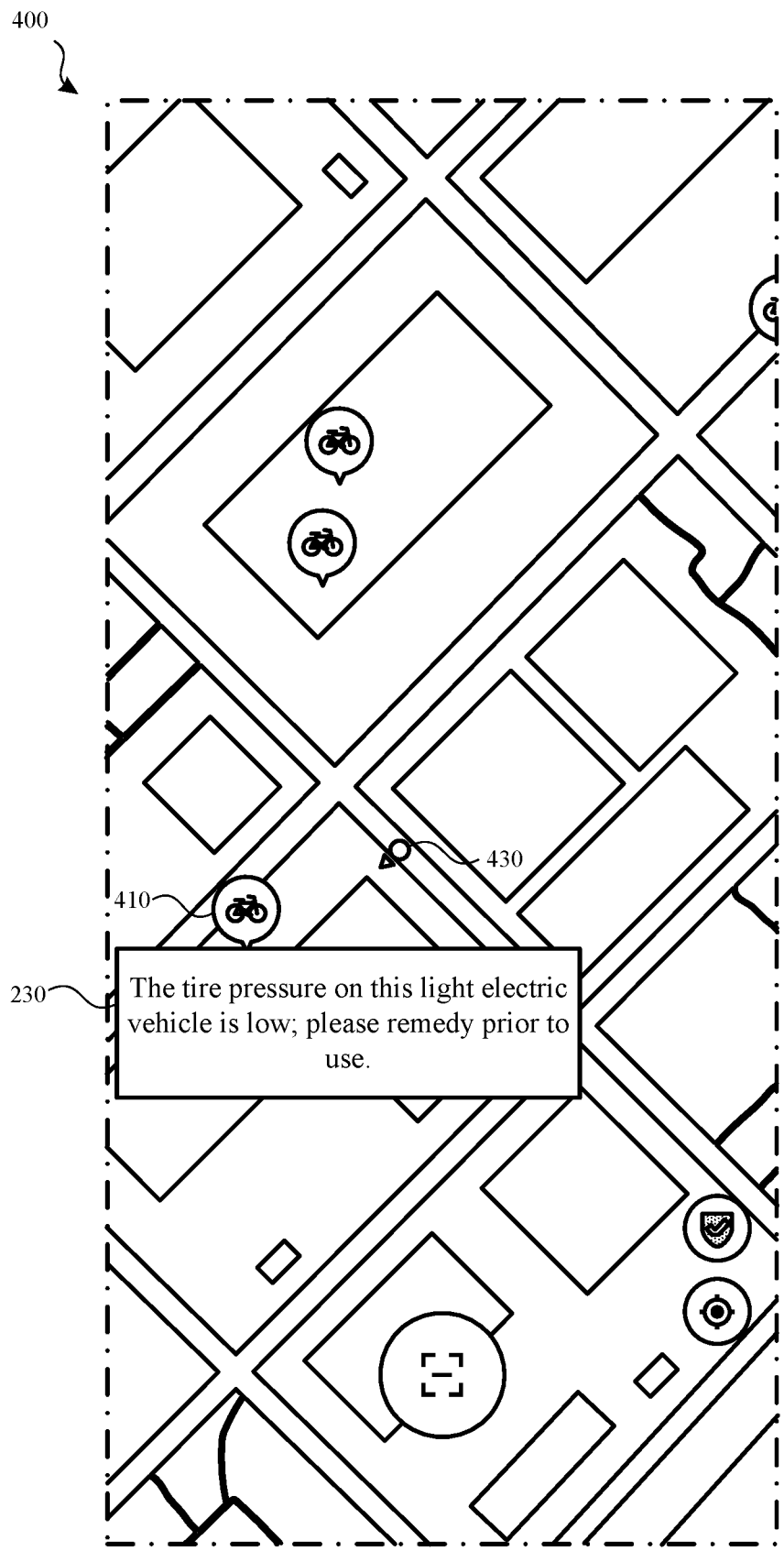
FIG. 4 illustrates an example user interface of a computing device, the example user interface showing instructions for addressing a detected maintenance event according to an example.

An example user interface 400 for a computing device showing a requested action and an example location of a light electric vehicle is shown in FIG. 4. For example, in response to receiving a reservation request (e.g., reservation request 350 (FIG. 3A)), a light electric vehicle management system may identify that a light electric vehicle, represented by icon 410, near a location of the requesting individual, represented by icon 430, is experiencing a maintenance event. In such an example, the user interface 400 displays a requested action 420. In this example, the requested action 420 is a request for the individual to address a tire pressure issue with the light electric vehicle. In some examples, the user interface 400 may also display or otherwise provide an incentive for the individual to perform the requested action 420.

Referring back to FIG. 3B, when the individual has performed the requested action 365, the computing device 355 may provide a notification to the maintenance system 315 that the requested action 365 is complete. The maintenance system 315 may then request additional electric vehicle information 370 to determine whether the requested action was performed and/or was performed correctly/completely.

Continuing with the tire pressure example from above, when the individual receives the requested action 365 to add air to one or more tires of the light electric vehicle 335, the individual may indicate, using her computing device 355, that she will perform the requested action. Once she has located the light electric vehicle 335 and performed the requested action, the individual may, using her computing device 355, provide a notification to the maintenance system 315, that the requested action has been performed. In response to receiving the notification, the maintenance system 315 may request or otherwise receive tire pressure information (e.g. additional light electric vehicle information 370) from one or more tire pressure sensors to ensure that the requested action was performed as indicated.

As briefly explained above, the system 300 may also be used to match the requesting individual to a particular light electric vehicle 335 based, at least in part, on a determined rider type of the requesting individual. The rider type may be associated with a particular predefined rider profile (e.g., an experienced rider profile, a new rider profile, a power rider profile, an aggressive rider profile, a commuter profile, etc.). In some examples, the individual may be informed of their determined rider type by the light electric vehicle management system 305.

For example, when a reservation request is received by the light electric vehicle management system 305, the light electric vehicle management system 305 may inform the individual that she is an aggressive rider. As such, the individual may be matched to a particular subset of light electric vehicles 335. The rider type may be based on riding habits of the individual (e.g., how fast the individual rides light electric vehicles 335, how quickly the individual accelerates, how hard the individual applies the brakes of the light electric vehicle 335, whether the individual rides/jumps off of curbs, etc.) and/or a riding profile (e.g., routes taken by the individual, the number of times the individual has ridden light electric vehicles 335, etc.) of the individual and on light electric vehicle information 340. The identified rider type may change or be updated by the light electric vehicle management system 305 as additional information (e.g., additional riding parameter information) is received.

For example, the light electric vehicle management system 305 may determine, based on rider profile information 345, that the individual that submitted the reservation request 350 is an aggressive rider. As such, the light electric vehicle management system 305 may identify, using information in the maintenance system 315 and/or route/location information system 320, which light electric vehicles 335 in or around the location of the requesting individual have performance parameters and/or maintenance histories that are best suited to the requesting individual.

For example, a fleet of light electric vehicles 335 may have different versions or models of light electric vehicles and some of those models or versions may be more suited for aggressive riders than others. Likewise, a fleet of light electric vehicles may have light electric vehicles manufactured by different companies. Once the performance parameters of the light electric vehicles 335 are identified, the light electric vehicle management system 305 may match the individual to particular light electric vehicle 335 that will be most suited to the individual's riding style. The location information 360 (FIG. 3B) of the identified light electric vehicle 335 may be provided to the computing device 355 of the requesting individual.

This may include showing, in a user interface of the computing device 355, only those light electric vehicles that are best suited to the determined rider type of the individual and/or highlighting or color coding some or all of the light electric vehicle icons in a user interface. In some examples, the color coding or highlighting may represent light electric vehicles that are more suitable to the determined rider type of the requesting individual. For example, one light electric vehicle icon on a user interface may be displayed in green for a best match while another light electric vehicle icon on the user interface may be displayed in red to indicate a less desirable match.

In other examples, the light electric vehicle management system 305 may determine a hierarchy of light electric vehicles to show to the requesting individual. The hierarchy may be based, at least in part, on the rider profile information 345 and the light electric vehicle information 340 and/or performance parameters of the light electric vehicles 335. Additionally, the light electric vehicles 335 that are displayed on a user interface of the computing device 355 may be filtered based on distance, performance parameters, etc. and may be color coded or highlighted such as described above.

Figure 5B:
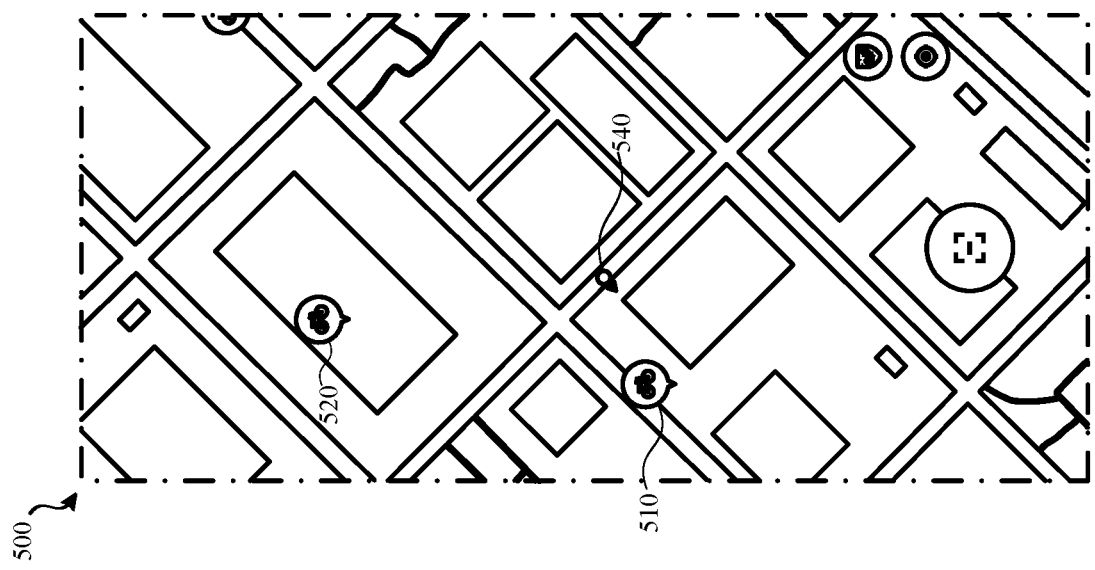
FIG. 5B illustrates the example user interface of FIG. 5A in which the location of one of the light electric vehicles has been removed according to an example.
Figure 5A:
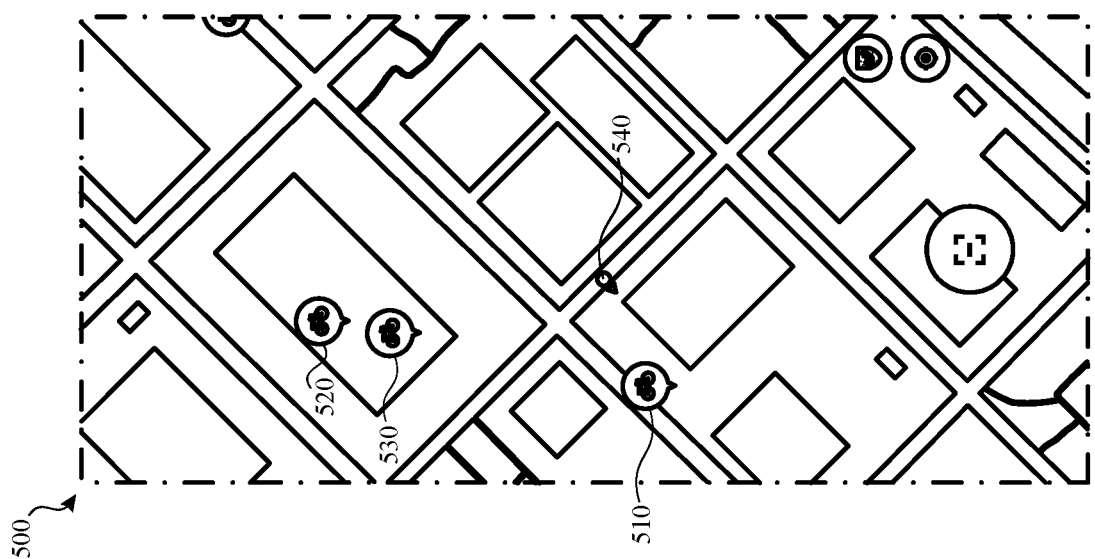
FIG. 5A illustrates an example user interface that shows a location of one or more light electric vehicles according to an example.

FIG. 5A-FIG. 5B illustrate an example user interface 500 that displays a location of light electric vehicles based on matching a determined rider type of an individual with performance metrics of light electric vehicles. For example, as shown in FIG. 5A, the user interface 500 displays a location of the requesting individual (represented by icon 540) and the location of three different light electric vehicles (represented by light electric vehicle icon 510, light electric vehicle icon 520, and light electric vehicle icon 530).

However, as shown in FIG. 5B, the light electric vehicle management system may determine, based at least in part on light electric vehicle information and on rider profile information that light electric vehicle represented by light electric vehicle icon 530, may not be well suited (at least when compared with the light electric vehicles represented by light electric vehicle icon 510 and light electric vehicle icon 520) to the rider type of the requesting individual. As such, the location of the light electric vehicle represented by light electric vehicle icon 530 is not provided on the user interface 500 of FIG. 5B.

Figure 6:
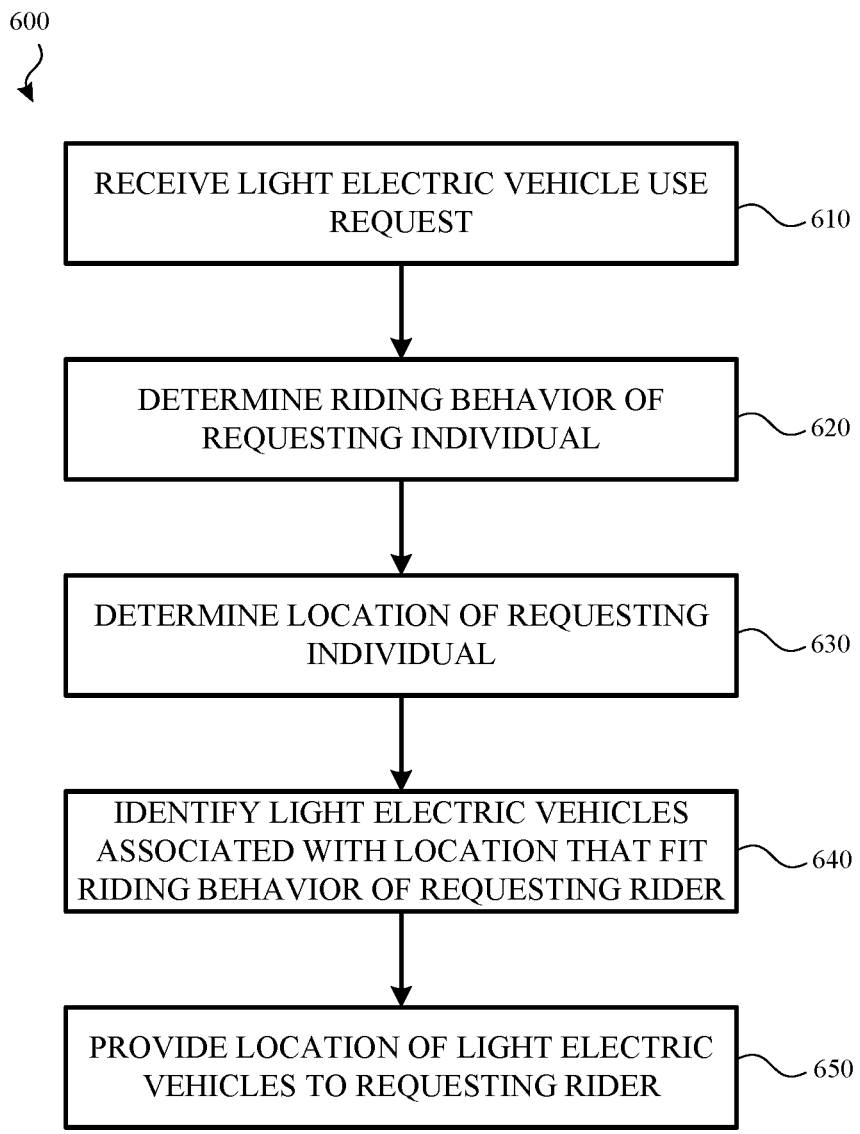
FIG. 6 illustrates a method for matching an individual with a light electric vehicle using a determined riding behavior of the individual and one or more performance metrics of a light electric vehicle according to an example.

FIG. 6 illustrates a method 600 for matching a light electric vehicle with a requesting individual based, at least in part, on a determined riding behavior of the requesting individual and one or more performance metrics of a light electric vehicle. The method 600 may be performed by one or more of the systems shown and described with respect to FIG. 2A-FIG. 3B.

Method 600 begins when a light electric vehicle use request is received (610) by a system, such as, for example, a light electric vehicle management system. In some examples, the use request is provided by an application executing on a computing device associated with an individual that wants to reserve and use a light electric vehicle. The use request may contain profile information associated with the individual.

The profile information may include or otherwise be used to determine (620) riding habits (e.g., determine a type of rider) of the individual that is associated with or that otherwise submitted the light electric vehicle use request. In some examples, the riding habits may be included or otherwise associated with the light electric vehicle use request. For example, profile information received as part of the use request may include information about the riding habits of the individual. In other examples, the use request may include information that allows the light electric vehicle management system to identify previously received and stored riding habits and/or profile information of the requesting individual. In yet other examples, riding habits of the individual may be received by the light electric vehicle management system in real-time or substantially real-time as the individual is riding the light electric vehicle.

Riding habits of the individual may be used to build a rider profile for the individual. The rider profile may include information about how the individual likes to ride the light electric vehicle and may include information about how often and when the individual switches gear ratios, typical riding speeds of the individual, a pedaling cadence of the individual, a pedaling frequency of the individual, an amount of charge of a rechargeable battery of the light electric vehicle that is consumed by light electric vehicle as the individual rides the light electric vehicle, how often and when the individual uses an electric assist motor of the light electric vehicle, how aggressively the individual brakes, how aggressive the individual rides the light electric vehicle, etc.

The light electric vehicle management system may also determine (630) a location of the requesting individual. The location information may be based on GPS data or other location-based data received from a computing device associated with the individual. The location information of the individual may be included or otherwise associated with the use request. The location information may be used to identify (640) one or more light electric vehicles in an area that are associated with the location of the individual and that have performance metrics or performance characteristics that match the determined rider type of the requesting individual. The performance metrics of each light electric vehicle may be based, at least in part, on received light electric vehicle information.

For example, if the profile information of the requesting individual indicates the individual typically rides light electric vehicles at a particular speed, the light electric vehicle management system may identify only those light electric vehicles that can travel at that particular speed. Once the light electric vehicles are identified, the location of the light electric vehicles may be provided (650) on a user interface of the individual's computing device.

In some examples, the identified light electric vehicles may be filtered and displayed based, at least in part, on how well the performance characteristics of the light electric vehicle match the determined rider type of the requesting individual and/or on how far the light electric vehicle is from the location of the individual. For example, a first light electric vehicle may be identified by a green icon or green highlight on a user interface of a computing device indicating to the requesting individual that this particular light electric vehicle is a good match for the determined rider type of the individual. However, a second light electric vehicle may be identified by a yellow or red icon or highlight on a user interface of the computing device indicating to the requesting individual that the second light electric vehicle is not as good a match for the individual (at least when compared to the first light electric vehicle).

In some examples, the matching of requesting individuals to various light electric vehicles may be based, at least in part, on a determined distance between a location of the identified light electric vehicles and a location of the individual. For example, while the light electric vehicle management system may determine that the first light electric vehicle is a better match for the individual than the second light electric vehicle, the second light electric vehicle may be a block away from the requesting individual while the first light electric vehicle is four blocks away from the requesting individual. As such, the light electric vehicle management system may determine that the second light electric vehicle is a better match for the requesting individual than the first light electric vehicle. As such, the user interface may represent the location of the second light electric vehicle with a green highlight or green icon and represent the location of the first light electric vehicle with a yellow highlight or yellow icon.

Figure 7:
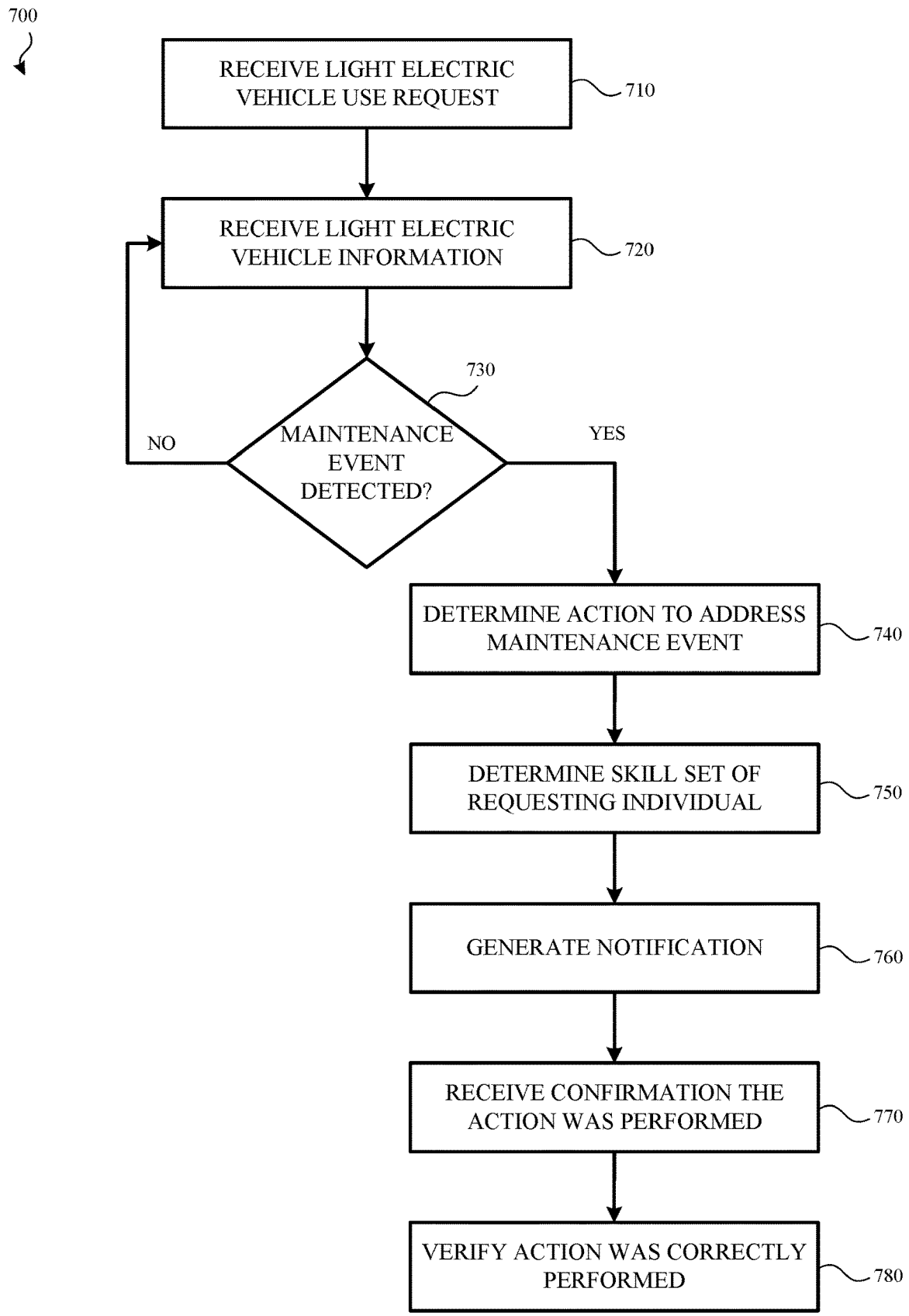
FIG. 7 illustrates a method for detecting and addressing a maintenance event of a light electric vehicle according to an example.

FIG. 7 illustrates a method 700 for detecting a maintenance event associated with a light electric vehicle according to an example. The method 700 may be performed by one or more of the systems shown and described with respect to FIG. 2A-FIG. 3B.

Method 700 begins when a system, such as, for example, a light electric vehicle management system, receives (710) a light electric vehicle use request. The request may be received in similar manner to any of those described herein and may include or be used to identify profile information of the requesting individual—including whether the individual has been trained or is otherwise certified to address one or more detected maintenance events. When the light electric vehicle use request is received, the light electric vehicle management system receives (720) or otherwise determines information associated with light electric vehicles associated with the location of the requesting individual.

Once the light electric vehicle information is received, the light electric vehicle management system may detect (or anticipate) (730) a maintenance event. In some examples, the light electric vehicle information may be received in real-time or substantially real-time. Thus, the light electric vehicle management system may also detect a maintenance event in real-time or substantially real-time. If the light electric vehicle management system does not detect a maintenance event, the light electric vehicle management system may continue to receive (720) light electric vehicle information such as previously described.

If the light electric vehicle management system detects a maintenance event, the light electric vehicle management system may determine (740) an action to address the maintenance event. In some examples, the light electric vehicle management system may have access to a database that stores a list of maintenance events, data indicative of those maintenance events and one or more actions that satisfy, solve or otherwise address those maintenance events. In other examples, the light electric vehicle management system may provide the light electric vehicle information to a technician and request the technician provide input (or additional input) regarding one or more possible actions to remedy the maintenance event.

When the action that addresses the maintenance event is determined, the profile information of the requesting individual is analyzed to determine (750) a skill set of the requesting individual. For example, the profile information is used to determine whether the requesting individual has a certification level or has otherwise been trained to perform the action that will address the detected maintenance event.

If the light electric vehicle management system determines the individual can perform the action, the light electric vehicle management system generates (760) a notification. The notification may include the requested action, one or more instructions regarding how to perform the requested action, a current (or anticipated) location of the light electric vehicle and/or an incentive for the requesting individual to perform the action. The notification may be provided to a computing device associated with the requesting individual.

The light electric vehicle management system may receive a confirmation, from the computing device of the requesting individual, that the requesting individual will perform the requested action. The light electric vehicle management system may also receive (770) confirmation that the action was performed. In some examples, the confirmation may be provided by a computing device associated with the requesting individual. In other examples, one or more sensors associated with the light electric vehicle may automatically provide information to the light electric vehicle management system that one or more actions have been or are being performed. For example, if the requested action is related to tire pressure, a tire pressure sensor may automatically send updated tire pressure information to the light electric vehicle management system as the individual is pumping up the tires of the light electric vehicle.

When confirmation of the performance of the action has been received, the light electric vehicle management system may request additional light electric vehicle information from the light electric vehicle in order to verify (780) the action was performed correctly. Referring back to the tire pressure example, the light electric vehicle management system may determine, using additional tire pressure sensor information, that the requesting individual filled the tires to the requested psi.

Figure 8:
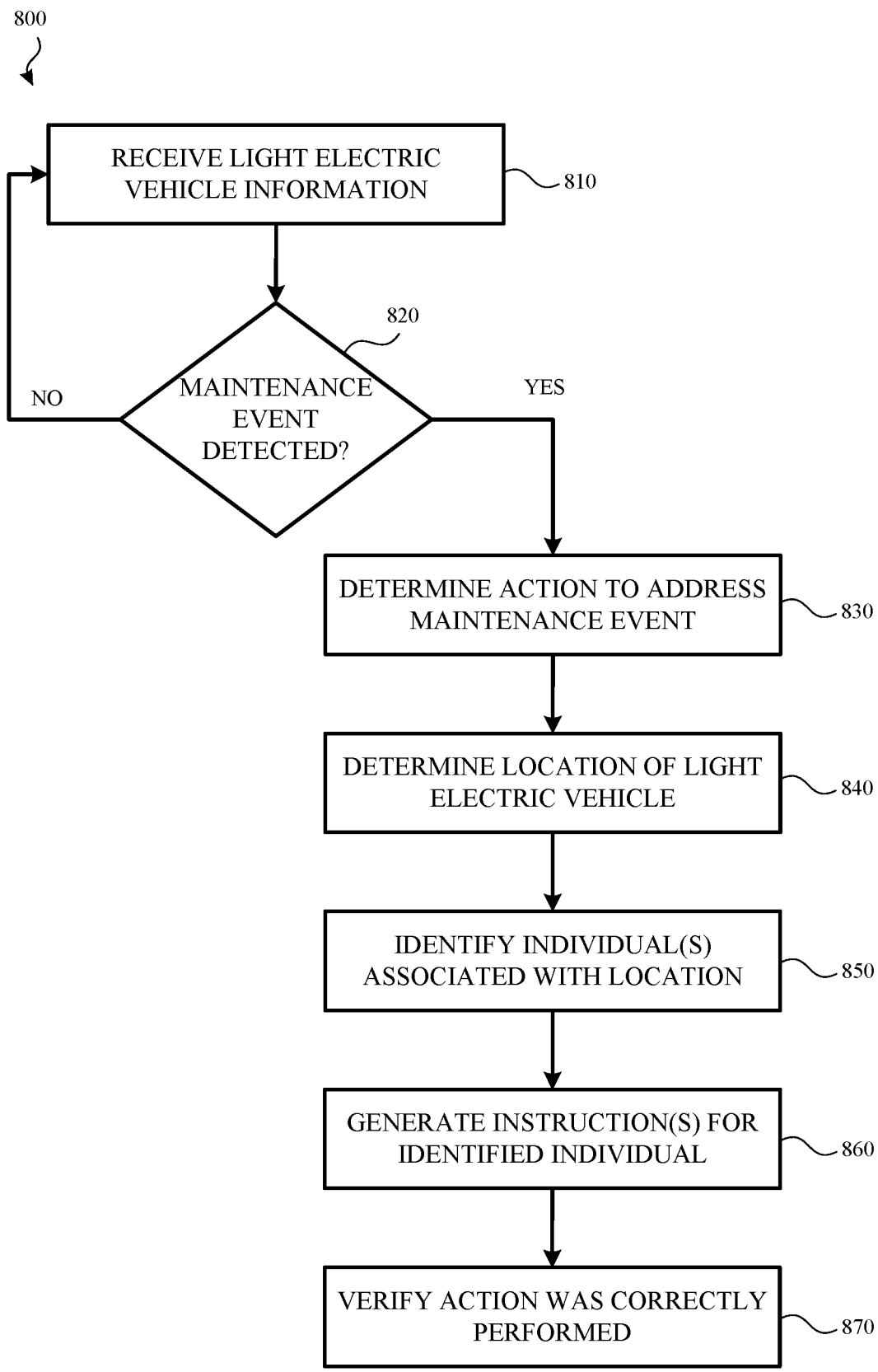
FIG. 8 illustrates another method for detecting and addressing a maintenance event of a light electric vehicle according to an example.

FIG. 8 illustrates a method 800 for detecting a maintenance event and identifying one or more individuals, associated with a current location or an anticipated destination of the light electric vehicle, that can perform a requested action to address the detected maintenance event according to an example. The method 800 may be performed by one or more of the systems shown and described with respect to FIG. 2A-FIG. 3B.

Method 800 begins when a system, such as, for example, a light electric vehicle management system, receives (810)

or otherwise determines light electric vehicle information. This information may be received in real-time or substantially real-time. In some examples, the light electric vehicle information may be received by the light electric vehicle management system as the light electric vehicle is ridden by an individual.

Once the light electric vehicle information is received, the light electric vehicle management system may use the light electric vehicle information detect (or anticipate) (820) a maintenance event such as previously described. If the light electric vehicle management system does not detect a maintenance event, the light electric vehicle management system may continue to receive (810) light electric vehicle information such as previously described.

If the light electric vehicle management system detects a maintenance event, the light electric vehicle management system may determine (830) an action to address the maintenance event. When the action that addresses the maintenance event is determined, the light electric vehicle management system may determine (840) a current location of the light electric vehicle and/or an anticipated destination of the light electric vehicle.

For example, if the light electric vehicle is being ridden by a first individual, the light electric vehicle management system may determine, based on route information (stored in profile information associated with the first individual), an anticipated destination of the light electric vehicle. The anticipated destination (or current location) may then be used by the light electric vehicle management system identify (850) one or more other individuals that are associated with the location and, based on profile information associated with the one or more other individuals, have training or are otherwise authorized to perform the determined action that addresses the maintenance event.

The light electric vehicle management system may then generate (860) a notification and provide the notification to a computing device associated with the identified one or more other individuals. The notification may include the requested action, one or more instructions regarding how to perform the requested action, a current (or anticipated) location of the light electric vehicle and/or an incentive for the individual to perform the action.

In some examples, the notification may be provided to a number of different individuals that are in or are otherwise associated with the determined or anticipated location of the light electric vehicle. In such examples, the light electric vehicle management system may provide the location of the light electric vehicle to the first individual that responds to the generated notification. If the first individual is not able to perform the requested action (either because the individual is not authorized to perform the requested action, is no longer in or near the location of the light electric vehicle and/or cannot perform the requested action within a threshold amount of time) the notification may be sent to a second individual. In some examples, the actual location of the light electric vehicle is not provided to the one or more other individuals until the current reservation of the light electric vehicle has ended (e.g., the first individual ends her use of the light electric vehicle). If the anticipated destination was incorrect, the light electric vehicle management system may identify other individuals associated with an updated anticipated location and/or actual location of the light electric vehicle.

The light electric vehicle management system may also receive confirmation that the action was performed such as previously described. When confirmation of the performance of the action has been received, the light electric vehicle management system may request additional information from the light electric vehicle in order to verify (870) the action was performed correctly.

Figure 9:
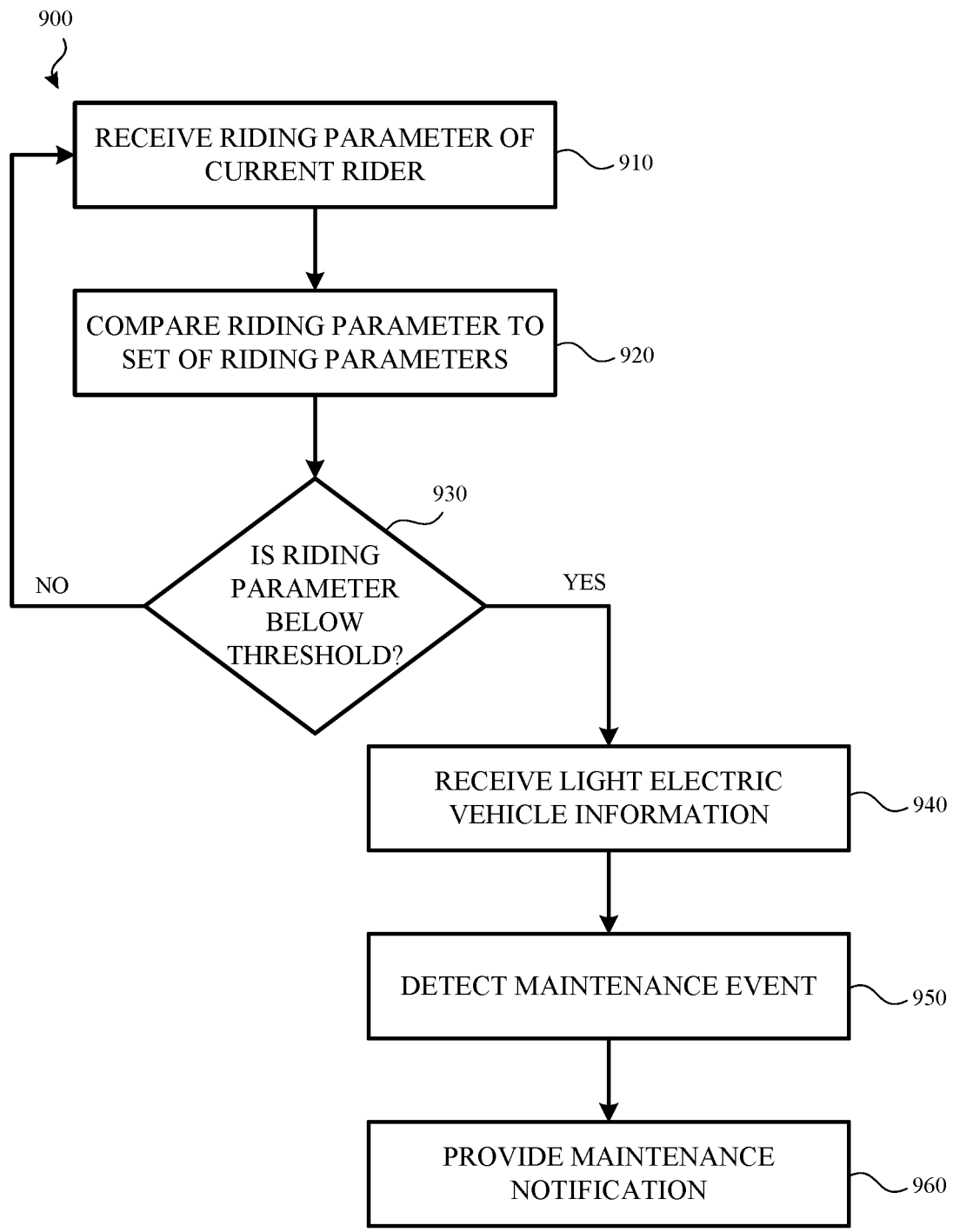
FIG. 9 illustrates a method for detecting a maintenance event of a light electric vehicle and providing a notification of the maintenance event to a computing device associated with an individual and/or a computing device associated with the light electric vehicle according to an example.

FIG. 9 illustrates a method 900 for detecting a maintenance event based on riding parameters of an individual. In some examples, the method 900 may be combined with the other methods described herein to detect a maintenance event. For example, when riding parameters are received that indicate the presence of a maintenance event (or anticipate a maintenance event) the light electric vehicle management system may request light electric vehicle information to help verify the occurrence of the maintenance event. The method 900 may be performed by one or more of the systems shown and described with respect to FIG. 2A-FIG. 3B.

Method 900 begins when rider parameter information is received (910) by the light electric vehicle management system. For example, the rider parameter information may include current (e.g., real-time or substantially real-time) information about a pedaling cadence of the individual as the individual rides the light electric vehicle, an average speed at which the individual is riding the light electric vehicle, the current amount of power of a rechargeable battery used by the light electric vehicle as the individual is riding the light electric vehicle, how often and when the individual shifts gears, and so on.

When this information is received, the light electric vehicle management system compares (920) these riding parameters to a set of previously received riding parameters. The comparison may be used to detect or otherwise anticipate a maintenance event. For example, using the comparison, the light electric vehicle management system may determine (930) whether the riding parameters of the individual are below a riding parameter threshold. In another example, the light electric vehicle management system may determine whether a difference between the current riding parameter and the previously received riding parameters are above a difference threshold. In some examples, the riding parameters received in operation 910 are compared with other riding parameters from the same or similar routes taken by the individual.

If the riding parameters are not below the riding parameter threshold (or are above a difference threshold, such as for example a ten percent difference, a fifteen percent difference, etc.), the light electric vehicle management system may continue to receive (910) riding parameters of the individual. However, if the riding parameters are below a threshold, the light electric vehicle management system may request and/or receive (940) light electric vehicle information from the light electric vehicle being ridden by the individual.

The light electric vehicle management system may use the received light electric vehicle information, either alone or in combination with, the riding parameter information, to detect (950) or otherwise determine a maintenance event and/or determine whether the individual is simply changing her riding habits. For example, the individual may be riding slower due to weather, time of the day, or the individual wants to go for a leisurely ride. In other examples, the riding parameter information may be used alone to determine or otherwise detect the maintenance event.

The light electric vehicle management system may then provide (960) a maintenance notification to a computing device associated with the individual. In some examples, the notification may be provided to the individual once the maintenance event is detected. In other examples, the notification may be provided to the individual once a use period of the light electric vehicle has ended. For example, the notification may request feedback from the individual to determine whether the individual noticed a difference in performance of the light electric vehicle. This information may be used to train the light electric vehicle management system to better identify maintenance events and whether some maintenance events affect the performance of the light electric vehicle while others do not affect the performance of the light electric vehicle.

In some examples, the maintenance notification may also be provided to the light electric vehicle. The maintenance notification may include one or more instructions that change or alter performance characteristics or metrics of the light electric vehicle. In some examples, the notification is accompanied by an audio output, a visual output and/or a haptic output. For example, if one or more gears are slipping as an individual changes gear ratios, the light electric vehicle management system may provide instructions to a computing device associated with the light electric vehicle that prevents an individual from changing gear ratios. In some examples, when remote fixes are applied to the light electric vehicle in such a manner, a notification of the change in performance or capabilities of the light electric vehicle is provided to a computing device of the individual and/or directly to the light electric vehicle. In the later example, the light electric vehicle may include a display on which the notification may be provided.

Additionally, when such remote fixes are applied, the remote fixes may be effectively undone or changed when the light electric vehicle is serviced by a technician. In other examples, the remote fix may be a permanent or semi-permanent fix.

Figure 10:
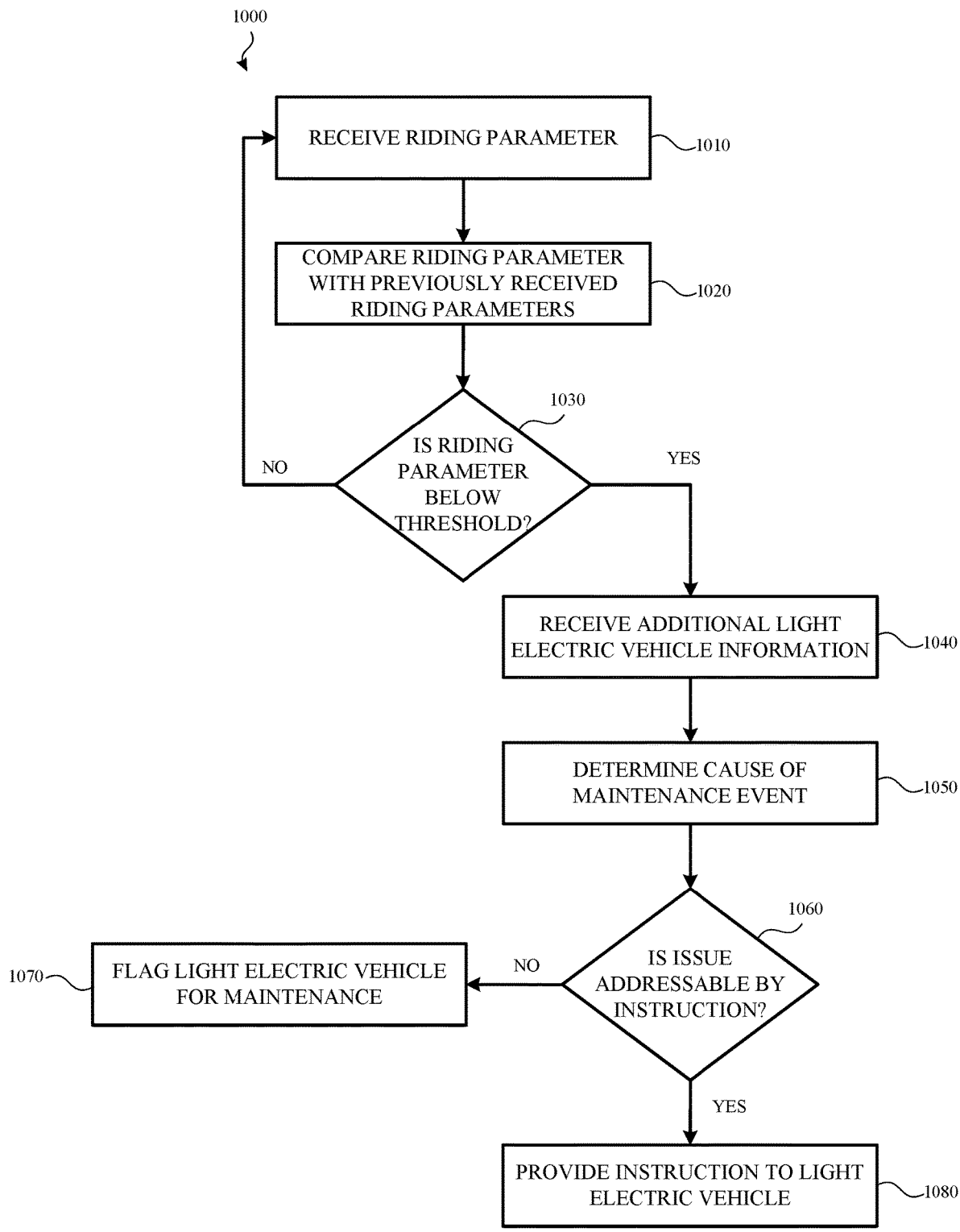
FIG. 10 illustrates a method for detecting and addressing a maintenance event of a light electric vehicle according to an example.

FIG. 10 illustrates a method 1000 for detecting a maintenance event according to an example. The method 1000 may be performed by one or more of the systems shown and described with respect to FIG. 2A-FIG. 3B.

Like method 900, method 1000 begins when rider parameter information is received (1010) by the light electric vehicle management system. Although rider parameter information is shown and described herein, the method 1000 may also be performed when light electric vehicle information, either alone, or in combination with, the rider parameter information, is received by the light electric vehicle management system.

When this information is received, the light electric vehicle management system compares (1020) the received information to a set of previously received riding parameters. The comparison may be used to detect (1030) or otherwise anticipate a maintenance event such as previously described. If the riding parameters are not below a threshold, the light electric vehicle management system may continue to receive (1010) riding parameters of the individual. However, if the riding parameters are below a threshold (or above a difference threshold such as previously described), the light electric vehicle management system may request and/or receive (1040) additional light electric vehicle information from the light electric vehicle ridden by the individual.

The light electric vehicle management system may use the additional light electric vehicle information, either alone or in combination with the riding parameter information, to detect or otherwise determine (1050) the cause of the maintenance event. The light electric vehicle management system may then determine (1060) whether the maintenance event is addressable by one or more instructions that may be provided to a computing device associated with the light electric vehicle.

For example, the riding parameter information and/or the light electric vehicle information may indicate that an electric assist motor of the light electric vehicle is not providing enough power for the individual to maintain her desired average speed. As such, the light electric vehicle management system may instruct the computing device of the light electric vehicle to cause the electric assist motor to use additional battery power to enable the light electric vehicle to reach the desired speed.

Referring back to FIG. 10, if the light electric vehicle management system determines the maintenance event is not addressable by an instruction (e.g., a remote fix such as described above), the light electric vehicle is flagged (1070) for maintenance. Once the light electric vehicle is flagged for maintenance, the methods (or portions of the methods) described in FIG. 7, FIG. 8 and/or FIG. 9 may be performed.

However, if the light electric vehicle management system determines the maintenance event is addressable by an instruction, the light electric vehicle management system provides (1080) the instruction to the light electric vehicle.

Figure 11:
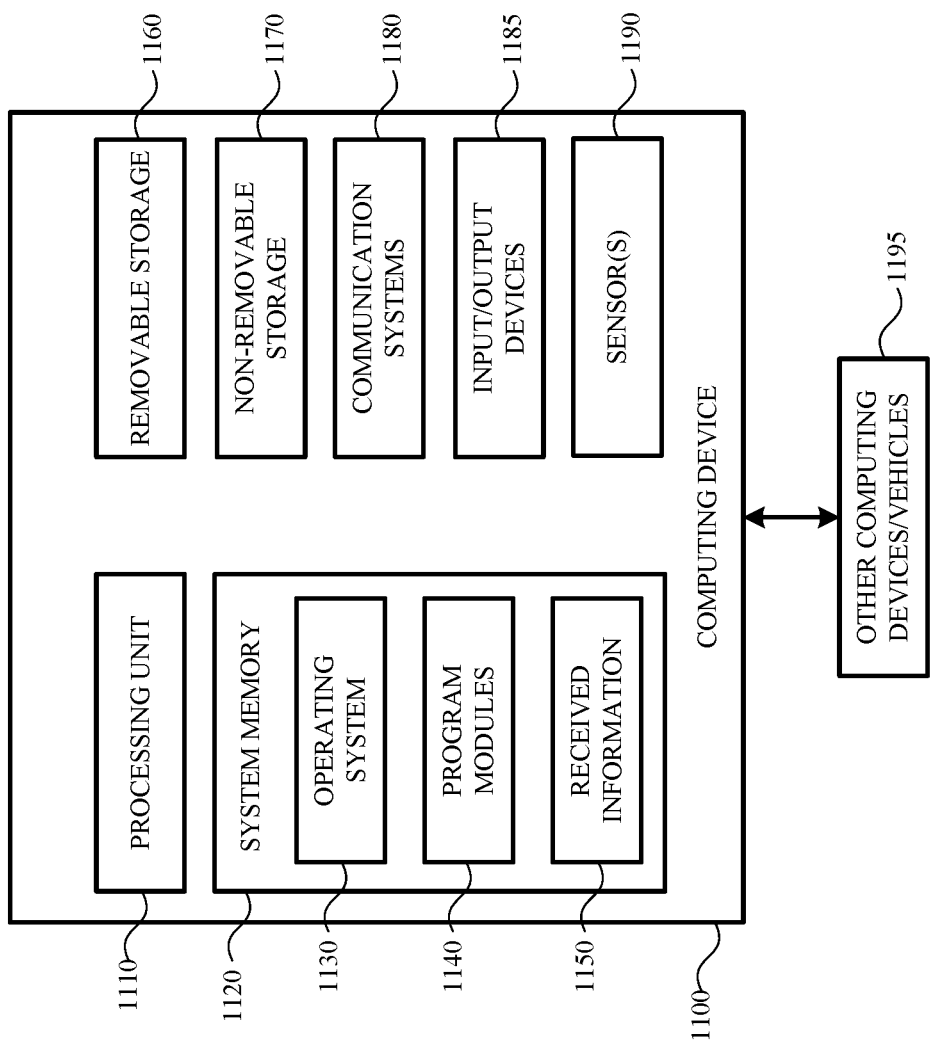
FIG. 11 illustrates a computing device that may be used by the light electric vehicles and/or systems described herein.

FIG. 11 is a system diagram of a computing device 1100 according to an example. The computing device 1100 may be integrated with or associated with a light electric vehicle, such as light electric vehicle 235 and light electric vehicle 335 shown and described with respect to FIG. 2A-FIG. 3B. The computing device 1100 may also be associated or otherwise integrated with the various systems shown and described with respect to FIG. 1-FIG. 3B. As shown in FIG. 11, the physical components (e.g., hardware) of the computing are illustrated and these physical components may be used to practice the various aspects of the present disclosure.

The computing device 1100 may include at least one processing unit 1110 and a system memory 1120. The system memory 1120 may include, but is not limited to, volatile storage (e.g., random access memory), non-volatile storage (e.g., read-only memory), flash memory, or any combination of such memories. The system memory 1120 may also include an operating system 1130 that control the operation of the computing device 1100 and one or more program modules 1140. The program modules 1140 may be responsible for gathering or determining rider profile information, light electric vehicle information, riding habit information, and so on. The memory may also store this received/determined information 1150 or otherwise provide access to this information.

The computing device 1100 may also have additional features or functionality. For example, the computing device 1100 may include additional data storage devices (e.g., removable and/or non-removable storage devices) such as, for example, magnetic disks, optical disks, or tape. These additional storage devices are labeled as a removable storage 1160 and a non-removable storage 1170.

A number of different program modules and data files may be stored in the system memory 1120. While executing on the processing unit 1110, the program modules 1140 may perform the various processes described above.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 11 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 1100 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 1100 may include one or more communication systems 1180 that enable the electric vehicle to communicate with rechargeable batteries, other computing devices 1195 (e.g., remote computing devices), a network service and the like. Examples of communication systems 1180 include, but are not limited to, radio frequency (RF) transmitter, receiver, and/or transceiver circuitry, a Controller Area Network (CAN) bus, a universal serial bus (USB), parallel, and/or serial ports.

The computing device 1100 may also have one or more input devices and/or one or more output devices shown as input/output devices 1185. These input/output devices 1185 may include a keyboard, a sound or voice input device, a touch, force and/or swipe input device, a display, speakers, tactile/haptic output systems etc. The aforementioned devices are examples and others may be used.

The computing device 1100 may also include one or more sensors 1190. The sensors 1190 may be used to detect or otherwise provide information about the operating condition of the computing device 1100. In other examples, the sensors 1190 may provide information about a light electric vehicle to which the computing device 1100 is associated. For example, the sensors 1190 may include a tire pressure sensor, an image sensor, a speed sensor, a tire alignment sensor, a rechargeable battery sensor and so on.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1120, the removable storage 1160, and the non-removable storage 1170 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In view of the above, some examples of the present disclosure describe a computer-implemented method, comprising: receiving light electric vehicle information from one or more sensors associated with a light electric vehicle; determining, using the light electric vehicle information, a maintenance event associated with the light electric vehicle; determining, an action that addresses the maintenance event; determining, based at least in part, on profile information of an individual riding the light electric vehicle, that the individual can perform the action; in response to determining the individual can perform the action, generating a notification that provides information about the maintenance event; and sending the notification to a computing device associated with the individual user. In some examples, the profile information includes a certification level of the individual. In some examples, the certification level comprises one or more actions the individual is authorized to perform on the light electric vehicle, wherein each of the one or more actions address a particular maintenance event. In some examples, an indication is received that the individual has performed the action. In some examples, the indication is received from the one or more sensors. In some examples, the indication is received from the computing device associated with the individual. In some examples, the indication includes additional light electric vehicle information from the one or more sensors. In some examples, the additional light electric vehicle information indicates whether the action was performed correctly.

In some examples, a system comprising at least one processor and a memory coupled to the at least one processor is described. The memory stores instructions that, when executed by the at least one processor, causes the at least one processor to perform operations, comprising: receiving light electric vehicle information from one or more sensors associated with a light electric vehicle; determining, using the light electric vehicle information, a maintenance event associated with the light electric vehicle; determining an anticipated destination of the light electric vehicle based, at least in part, on rider profile information associated with an individual that is using the light electric vehicle; identifying one or more individuals associated with the anticipated destination that are qualified to perform an action that addresses the maintenance event; and sending a notification to a computing device associated with at least one of the one or more individuals, the notification including a request that the at least one of the one or more individuals perform the action on the light electric vehicle when the light electric vehicle reaches the anticipated destination. In some examples, the instructions enable updating the destination based, at least in part, on additional sensor information received from the light electric vehicle; and sending the updated destination to the computing device associated with the at least one of the one or more individuals. In some examples, the destination of the light electric vehicle is estimated based, at least in part, on profile information of the individual that is using the light electric vehicle. In some examples, the instructions enable receiving an indication that the at least one individual has performed the action. In some examples, the instructions enable determining, based at least in part, on received additional sensor information, whether the action addressed the maintenance event. In some examples, the instructions enable providing a suggested destination for the light electric vehicle to a computing device associated with the individual that is using the light electric vehicle. In some examples, the instructions enable providing the suggested destination to the computing device associated with the at least one of the one or more individuals.

In another example, a computer-implemented method is described. The computer-implemented method, comprising: receiving light electric vehicle condition information from a light electric vehicle, the light electric vehicle condition information indicating a maintenance event; determining a current location of the light electric vehicle; receiving a riding request from an individual, the individual being associated with the current location of the light electric vehicle; determining, based at least in part on profile information associated with the individual, whether the individual is trained to perform an action to remedy the maintenance event; and when it is determined that the individual is trained to perform the action to remedy the maintenance event, providing a notification to a computing device associated with the individual, the notification including: the current location of the light electric vehicle; and the action to be performed on the light electric vehicle to remedy the maintenance event. In some examples, the notification further includes information about an incentive for the individual to perform the action. In some examples, the method also comprises receiving a verification that the individual will perform the action. In some examples, the method also comprises verifying the action was properly performed. In some examples, verifying the action was properly performed comprises analyzing additional information to determine whether the maintenance event is ongoing.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A computer-implemented method comprising:
receiving information from one or more sensors associated with a light electric vehicle;
determining, using the information from the one or more sensors associated with the light electric vehicle, a maintenance event associated with the light electric vehicle;
determining an anticipated destination of the light electric vehicle;
identifying one or more individuals associated with the anticipated destination that are qualified to perform an action that addresses the maintenance event or a system that is capable of addressing the maintenance event; and
sending: (i) a notification to a computing device associated with at least one of the one or more individuals associated with the anticipated destination that are qualified to perform the action that addresses the maintenance event or (ii) instruction data to the system that is capable of addressing the maintenance event,
wherein the notification comprises a request that the at least one of the one or more individuals perform the action on the light electric vehicle,
wherein the instruction data indicates the maintenance event to the system that is capable of addressing the maintenance event.

2. The computer-implemented method of claim 1, wherein the one or more individuals associated with the anticipated destination are within a threshold distance of the anticipated destination.

3. The computer-implemented method of claim 1, wherein the system that is capable of addressing the maintenance event comprises a system of the light electric vehicle.

4. The computer-implemented method of claim 1, further comprising:
receiving an indication that the action that addresses the maintenance event has been performed.

5. The computer-implemented method of claim 4, wherein the indication is provided from the computing device associated with at least one of the one or more individuals associated with the anticipated destination.

6. The computer-implemented method of claim 4, wherein the indication is provided from the system that is capable of addressing the maintenance event.

7. The computer-implemented method of claim 1, further comprising:
receiving a verification that the maintenance event will be addressed.

8. A system comprising:
at least one processor; and
at least one memory that stores instructions that are executable by the at least one processor to cause the at least one processor to perform operations, the operations comprising:
receiving information from one or more sensors associated with a light electric vehicle;
determining, using the information from the one or more sensors associated with the light electric vehicle, a maintenance event associated with the light electric vehicle;
determining an anticipated destination of the light electric vehicle;
identifying one or more individuals associated with the anticipated destination that are qualified to perform an action that addresses the maintenance event or a system that is capable of addressing the maintenance event; and
sending: (i) a notification to a computing device associated with at least one of the one or more individuals associated with the anticipated destination that are qualified to perform the action that addresses the maintenance event or (ii) instruction data to the system that is capable of addressing the maintenance event,
wherein the notification comprises a request that the at least one of the one or more individuals perform the action on the light electric vehicle,
wherein the instruction data indicates the maintenance event to the system that is capable of addressing the maintenance event.

9. The system of claim 8, wherein the one or more individuals associated with the anticipated destination are within a threshold distance of the anticipated destination.

10. The system of claim 8, wherein the system that is capable of addressing the maintenance event comprises a system of the light electric vehicle.

11. The system of claim 8, further comprising:
receiving an indication that the action that addresses the maintenance event has been performed.

12. The system of claim 11, wherein the indication is provided from the computing device associated with at least one of the one or more individuals associated with the anticipated destination.

13. The system of claim 11, wherein the indication is provided from the system that is capable of addressing the maintenance event.

14. The system of claim 8, further comprising:
receiving a verification that the maintenance event will be addressed.

15. A computer-implemented method comprising:
receiving information from one or more sensors associated with a light electric vehicle;
determining, using the information from the one or more sensors associated with the light electric vehicle, a maintenance event associated with the light electric vehicle;
determining an anticipated destination of the light electric vehicle;
identifying one or more individuals associated with the anticipated destination that are qualified to perform an action that addresses the maintenance event or a system that is capable of addressing the maintenance event; and
sending: (i) a notification to a computing device associated with at least one of the one or more individuals associated with the anticipated destination that are qualified to perform the action that addresses the maintenance event or (ii) instruction data to the system that is capable of addressing the maintenance event.

16. The computer-implemented method of claim 15, wherein the notification comprises a request that the at least one of the one or more individuals perform the action on the light electric vehicle.

17. The computer-implemented method of claim 15, wherein the instruction data indicates the maintenance event to the system that is capable of addressing the maintenance event.

18. The computer-implemented method of claim 16, wherein the system that is capable of addressing the maintenance event comprises a system of the light electric vehicle.

19. The computer-implemented method of claim 15, further comprising:
receiving a verification that the maintenance event will be addressed.

20. The computer-implemented method of claim 15, further comprising: and
receiving an indication that the maintenance event has been addressed.

* * * * *